United States Patent
Abedini et al.

(10) Patent No.: US 11,778,570 B2
(45) Date of Patent: Oct. 3, 2023

(54) TRANSMIT POWER ADJUSTMENT FOR SYNCHRONIZATION SIGNAL BLOCK (SSB)

(71) Applicant: QUALCOMM Incorporated, San Diego, CA (US)

(72) Inventors: Navid Abedini, Basking Ridge, NJ (US); Qian Zhang, Basking Ridge, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 17/443,294

(22) Filed: Jul. 23, 2021

(65) Prior Publication Data

US 2023/0029173 A1 Jan. 26, 2023

(51) Int. Cl.
*H04W 52/38* (2009.01)
*H04L 5/14* (2006.01)
(Continued)

(52) U.S. Cl.
CPC ............... *H04W 52/38* (2013.01); *H04L 5/14* (2013.01); *H04W 52/36* (2013.01); *H04W 56/001* (2013.01)

(58) Field of Classification Search
CPC ... H04W 52/38; H04W 52/36; H04W 56/001; H04L 5/14
See application file for complete search history.

(56) References Cited

U.S. PATENT DOCUMENTS

2019/0159136 A1* 5/2019 MolavianJazi ..... H04W 52/362
2020/0015236 A1* 1/2020 Kung .................... H04W 16/14
(Continued)

FOREIGN PATENT DOCUMENTS

EP 3429281 A1 1/2019
EP 3471296 A1 4/2019
(Continued)

OTHER PUBLICATIONS

International Search Report and Written Opinion—PCT/US2022/072982—ISA/EPO—dated Oct. 4, 2022.
(Continued)

*Primary Examiner* — Hassan A Phillips
*Assistant Examiner* — Prenell P Jones
(74) *Attorney, Agent, or Firm* — Arun Swain

(57) ABSTRACT

This disclosure provides systems, methods and apparatuses for transmission of synchronization signal blocks (SSBs) using adjusted transmit powers. In one aspect, a power offset may be configured for one or more sets of SSBs. The power offset may be configured to be applied for a set of SSBs based on a duplexing mode of one or more of a transmitter wireless node (that transmits an SSB) or a receiver wireless node (that receives the SSB). The duplexing mode may be based on whether the transmitter receiver node or the wireless receiver node is operating in a full-duplex mode or may be based on a resource configuration associated with a resource used to transmit the SSB. Some techniques and apparatuses described herein also provide signaling to support the transmission of SSBs using adjusted transmit powers, and techniques for receiving and processing SSBs that use adjusted transmit powers.

30 Claims, 13 Drawing Sheets

(51) Int. Cl.
   *H04W 52/36* (2009.01)
   *H04W 56/00* (2009.01)

(56) References Cited

U.S. PATENT DOCUMENTS

| | | | |
|---|---|---|---|
| 2020/0084642 A1* | 3/2020 | Siomina | H04W 56/001 |
| 2020/0107277 A1* | 4/2020 | Jeon | H04W 52/36 |
| 2020/0275492 A1* | 8/2020 | Lei | H04L 5/0053 |
| 2020/0322095 A1* | 10/2020 | Park | H04W 76/27 |
| 2020/0374837 A1* | 11/2020 | Harada | H04L 5/0094 |
| 2021/0014893 A1* | 1/2021 | Park | H04W 36/08 |
| 2021/0051672 A1* | 2/2021 | Rastegardoost | H04W 72/0493 |
| 2021/0152320 A1* | 5/2021 | Sundararajan | G06F 13/4282 |
| 2021/0211985 A1* | 7/2021 | Ohta | H04W 56/001 |
| 2021/0212007 A1* | 7/2021 | Liu | H04B 7/15528 |
| 2021/0337570 A1* | 10/2021 | Yang | H04L 5/0078 |
| 2021/0345321 A1* | 11/2021 | Wu | H04W 16/10 |
| 2021/0360701 A1* | 11/2021 | Xu | H04L 5/0053 |
| 2021/0368459 A1* | 11/2021 | Zhang | H04W 8/24 |
| 2021/0377884 A1* | 12/2021 | Lee | H04W 56/001 |
| 2021/0410084 A1* | 12/2021 | Li | H04W 52/265 |
| 2022/0014344 A1* | 1/2022 | Zhang | H04L 5/0053 |
| 2022/0022267 A1* | 1/2022 | Shi | H04W 74/0841 |
| 2022/0039022 A1* | 2/2022 | Liu | H04W 52/143 |
| 2022/0046552 A1* | 2/2022 | Xu | H04L 5/0092 |
| 2022/0095309 A1* | 3/2022 | MolavianJazi | H04W 56/001 |
| 2022/0159741 A1* | 5/2022 | Hoang | H04W 72/0453 |
| 2022/0180748 A1* | 6/2022 | Kwak | G08G 1/16 |
| 2022/0191940 A1* | 6/2022 | MolavianJazi | H04B 17/318 |
| 2022/0201630 A1* | 6/2022 | Ko | H04J 11/00 |
| 2022/0212542 A1* | 7/2022 | Ortmann | B60T 8/321 |
| 2022/0217657 A1* | 7/2022 | Hong | H04L 1/18 |
| 2022/0224407 A1* | 7/2022 | Shrestha | H04B 7/18589 |
| 2022/0232667 A1* | 7/2022 | Back | H04W 4/40 |
| 2022/0264475 A1* | 8/2022 | Yi | H04W 52/325 |
| 2022/0312455 A1* | 9/2022 | Zhu | H04W 72/1273 |
| 2022/0322252 A1* | 10/2022 | Chen | H04W 56/001 |
| 2022/0385381 A1* | 12/2022 | MolavianJazi | H04W 72/042 |
| 2023/0029173 A1* | 1/2023 | Abedini | H04W 52/243 |

FOREIGN PATENT DOCUMENTS

| | | | |
|---|---|---|---|
| EP | 3739970 A1 | 11/2020 | |
| WO | WO-2020206573 A1 * | 10/2020 | H04W 52/08 |
| WO | 2021035457 A1 | 3/2021 | |

OTHER PUBLICATIONS

VIVO: "Report Offline [046] ssb-Positioninburst in SIB1 and ServincellConfigCommon", 3GPP TSG-RAN WG2 AH-1807, R2-1810887 [046] Draft Report On Ssb-Positionsinburst Discussion, 3rd Generation Partnership Project, Mobile Competence Centre, 650, Route Des Lucioles, F-06921 Sophia-Antipolis C, vol. RAN WG2, No. Montreal, Canada, Jul. 2, 2018-Jul. 6, 2018, 5 Pages, Jul. 8, 2018, XP051526601, the whole document.

* cited by examiner

TRANSMIT POWER ADJUSTMENT FOR SYNCHRONIZATION SIGNAL BLOCK (SSB)

TECHNICAL FIELD

Aspects of the present disclosure relate generally to wireless communication and to techniques for transmit power adjustment for a synchronization signal block (SSB).

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication performed by an apparatus of a wireless node. The method may include transmitting, in a first duplexing mode, a first synchronization signal block (SSB) with a first transmit power configuration that is associated with the first duplexing mode, the first transmit power configuration being configured for a set of first SSBs including the first SSB and associated with the first duplexing mode. The method may include transmitting, in a second duplexing mode, a second SSB with a second transmit power configuration that is different than the first transmit power configuration and that is associated with the second duplexing mode, the second transmit power configuration being configured for a set of second SSBs including the second SSB and associated with the second duplexing mode.

In some implementations, the method can include transmitting information indicating a power offset for the set of first SSBs associated with the first duplexing mode, where the first transmit power configuration is based on the power offset.

In some implementations, the first duplexing mode is at least one of: a half-duplex (HD) mode at the wireless node, a full-duplex (FD) mode at the wireless node, an FD mode at a receiver wireless node, an HD mode at a receiver wireless node, or an integrated access and backhaul (IAB) mode, where a resource for the first SSB overlaps with a resource for communication with a mobile termination.

In some implementations, the set of first SSBs are indicated using a bitmap. In some implementations, the set of first SSBs are indicated using a set of SSB indices.

In some implementations, the first SSB is transmitted with the first transmit power configuration based on the first SSB being transmitted on a resource that overlaps with a configured communication resource.

Another innovative aspect of the subject matter described in this disclosure can be implemented in an apparatus of a wireless node for wireless communication. The apparatus may include one or more interfaces configured to output, in a first duplexing mode, a first SSB with a first transmit power configuration that is associated with the first duplexing mode, the first transmit power configuration being configured for a set of first SSBs including the first SSB and associated with the first duplexing mode. The one or more interfaces may be configured to output, in a second duplexing mode, a second SSB with a second transmit power configuration that is different than the first transmit power configuration and that is associated with the second duplexing mode, the second transmit power configuration being configured for a set of second SSBs including the second SSB and associated with the second duplexing mode.

In some implementations, the one or more interfaces are configured to transmit information indicating a power offset for the set of first SSBs associated with the first duplexing mode, where the first transmit power configuration is based on the power offset.

In some implementations, the first duplexing mode is at least one of: an HD mode at the wireless node, an FD mode at the wireless node, an FD mode at a receiver wireless node, an HD mode at a receiver wireless node, or an IAB mode, where a resource for the first SSB overlaps with a resource for communication with a mobile termination.

In some implementations, the set of first SSBs are indicated using a bitmap. In some implementations, the set of first SSBs are indicated using a set of SSB indices.

In some implementations, the first SSB is transmitted with the first transmit power configuration based on the first SSB being transmitted on a resource that overlaps with a configured communication resource.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a wireless node, may cause the one or more processors to transmit, in a first duplexing mode, a first SSB with a first transmit power configuration that is associated with the first duplexing mode, the first transmit power configuration being configured for a set of first SSBs including the first SSB and associated with the first duplexing mode. The one or more instructions, when executed by one or more processors of the wireless node, may cause the one or more processors to transmit, in a second duplexing mode, a second SSB with a second transmit power configuration that is different than the first transmit power configuration and that is associated with the second duplexing mode, the second transmit power configuration being configured for a set of second SSBs including the second SSB and associated with the second duplexing mode.

In some implementations, the one or more instructions, when executed by one or more processors of the wireless node, may cause the one or more processors to transmit information indicating a power offset for the set of first SSBs associated with the first duplexing mode, where the first transmit power configuration is based on the power offset.

In some implementations, the first duplexing mode is at least one of: an HD mode at the wireless node, an FD mode at the wireless node, an FD mode at a receiver wireless node, an HD mode at a receiver wireless node, or an IAB mode, where a resource for the first SSB overlaps with a resource for communication with a mobile termination.

In some implementations, the set of first SSBs are indicated using a bitmap. In some implementations, the set of first SSBs are indicated using a set of SSB indices.

In some implementations, the first SSB is transmitted with the first transmit power configuration based on the first SSB being transmitted on a resource that overlaps with a configured communication resource.

Another innovative aspect of the subject matter described in this disclosure can be implemented in an apparatus for wireless communication. The apparatus may include means for transmitting, in a first duplexing mode, a first SSB with a first transmit power configuration that is associated with the first duplexing mode, the first transmit power configuration being configured for a set of first SSBs including the first SSB and associated with the first duplexing mode. The apparatus may include means for transmitting, in a second duplexing mode, a second SSB with a second transmit power configuration that is different than the first transmit power configuration and that is associated with the second duplexing mode, the second transmit power configuration being configured for a set of second SSBs including the second SSB and associated with the second duplexing mode.

In some implementations, the apparatus may include means for transmitting information indicating a power offset for the set of first SSBs associated with the first duplexing mode, where the first transmit power configuration is based on the power offset.

In some implementations, the first duplexing mode is at least one of: an HD mode at the wireless node, an FD mode at the wireless node, an FD mode at a receiver wireless node, an HD mode at a receiver wireless node, or an IAB mode, where a resource for the first SSB overlaps with a resource for communication with a mobile termination.

In some implementations, the set of first SSBs are indicated using a bitmap. In some implementations, the set of first SSBs are indicated using a set of SSB indices.

In some implementations, the first SSB is transmitted with the first transmit power configuration based on the first SSB being transmitted on a resource that overlaps with a configured communication resource.

Another innovative aspect of the subject matter described in this disclosure can be implemented in a method of wireless communication performed by an apparatus of a wireless node. The method may include obtaining an indication of a first transmit power configuration for a set of first SSBs associated with a first duplexing mode, and a second transmit power configuration for a set of second SSBs associated with a second duplexing mode. The method may include receiving an SSB using a selected transmit power configuration that is associated with a selected duplexing mode of the SSB, where the selected transmit power configuration is the first transmit power configuration if the selected duplexing mode is the first duplexing mode and the selected transmit power configuration is the second transmit power configuration if the selected duplexing mode is the second duplexing mode.

In some implementations, the method can include receiving information indicating a power offset for a set of SSBs, of the set of first SSBs and the set of second SSBs and associated with the selected duplexing mode, where the selected transmit power configuration is based on the power offset.

In some implementations, the selected duplexing mode is at least one of: an HD mode at a transmitter wireless node from which the SSB is received, an FD mode at the transmitter wireless node, an FD mode at the wireless node, an HD mode at the wireless node, or an IAB mode, where a resource for the SSB overlaps with a resource for communication with a mobile termination.

In some implementations, the SSB is received using the selected transmit power configuration based on the SSB being received on a resource that overlaps with a configured communication resource.

In some implementations, the method can include performing measurement or reporting regarding the SSB.

Another innovative aspect of the subject matter described in this disclosure can be implemented in an apparatus of a wireless node for wireless communication. The apparatus may include one or more interfaces configured to obtain an indication of a first transmit power configuration for a set of first SSBs associated with a first duplexing mode, and a second transmit power configuration for a set of second SSBs associated with a second duplexing mode. The one or more interfaces may be configured to obtain an SSB using a selected transmit power configuration that is associated with a selected duplexing mode of the SSB, where the selected transmit power configuration is the first transmit power configuration if the selected duplexing mode is the first duplexing mode and the selected transmit power configuration is the second transmit power configuration if the selected duplexing mode is the second duplexing mode.

In some implementations, the one or more interfaces are configured to obtain information indicating a power offset for a set of SSBs, of the set of first SSBs and the set of second SSBs and associated with the selected duplexing mode, where the selected transmit power configuration is based on the power offset.

In some implementations, the selected duplexing mode is at least one of: an HD mode at a transmitter wireless node from which the SSB is received, an FD mode at the transmitter wireless node, an FD mode at the wireless node, an HD mode at the wireless node, or an IAB mode, where a resource for the SSB overlaps with a resource for communication with a mobile termination.

In some implementations, the SSB is received using the selected transmit power configuration based on the SSB being received on a resource that overlaps with a configured communication resource.

In some implementations, the apparatus may include a processing system configured to perform measurement or reporting regarding the SSB.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a wireless node, may cause the one or more processors to obtain an indication of a first transmit power configuration for a set of first SSBs associated with a first duplexing mode, and a second transmit power configuration for a set of second SSBs associated with a second duplexing mode. The one or more instructions, when executed by one or more processors of the wireless node, may cause the one or more processors to receive an SSB using a selected transmit power configuration that is associated with a selected duplexing mode of the SSB, where the selected transmit power configuration is the first transmit power configuration if the selected duplexing mode is the first duplexing mode and the selected transmit power configuration is the second transmit power configuration if the selected duplexing mode is the second duplexing mode.

In some implementations, the one or more instructions, when executed by one or more processors of the wireless node, may cause the one or more processors to receive information indicating a power offset for a set of SSBs, of the set of first SSBs and the set of second SSBs and associated with the selected duplexing mode, where the selected transmit power configuration is based on the power offset.

In some implementations, the selected duplexing mode is at least one of: an HD mode at a transmitter wireless node from which the SSB is received, an FD mode at the transmitter wireless node, an FD mode at the wireless node, an HD mode at the wireless node, or an IAB mode, where a resource for the SSB overlaps with a resource for communication with a mobile termination.

In some implementations, the SSB is received using the selected transmit power configuration based on the SSB being received on a resource that overlaps with a configured communication resource.

In some implementations, the one or more instructions, when executed by one or more processors of the wireless node, may cause the one or more processors to perform measurement or reporting regarding the SSB.

Another innovative aspect of the subject matter described in this disclosure can be implemented in an apparatus for wireless communication. The apparatus may include means for obtaining an indication of a first transmit power configuration for a set of first SSBs associated with a first duplexing mode, and a second transmit power configuration for a set of second SSBs associated with a second duplexing mode. The apparatus may include means for receiving an SSB using a selected transmit power configuration that is associated with a selected duplexing mode of the SSB, where the selected transmit power configuration is the first transmit power configuration if the selected duplexing mode is the first duplexing mode and the selected transmit power configuration is the second transmit power configuration if the selected duplexing mode is the second duplexing mode.

In some implementations, the apparatus may include means for receiving information indicating a power offset for a set of SSBs, of the set of first SSBs and the set of second SSBs and associated with the selected duplexing mode, where the selected transmit power configuration is based on the power offset.

In some implementations, the selected duplexing mode is at least one of: an HD mode at a transmitter wireless node from which the SSB is received, an FD mode at the transmitter wireless node, an FD mode at the wireless node, an HD mode at the wireless node, or an IAB mode, where a resource for the SSB overlaps with a resource for communication with a mobile termination.

In some implementations, the SSB is received using the selected transmit power configuration based on the SSB being received on a resource that overlaps with a configured communication resource.

In some implementations, the apparatus may include means for performing measurement or reporting regarding the SSB.

Aspects generally include a method, apparatus, system, computer program product, non-transitory computer-readable medium, user equipment, base station, wireless communication device, or processing system as substantially described herein with reference to and as illustrated by the accompanying drawings.

Details of one or more implementations of the subject matter described in this disclosure are set forth in the accompanying drawings and the description. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
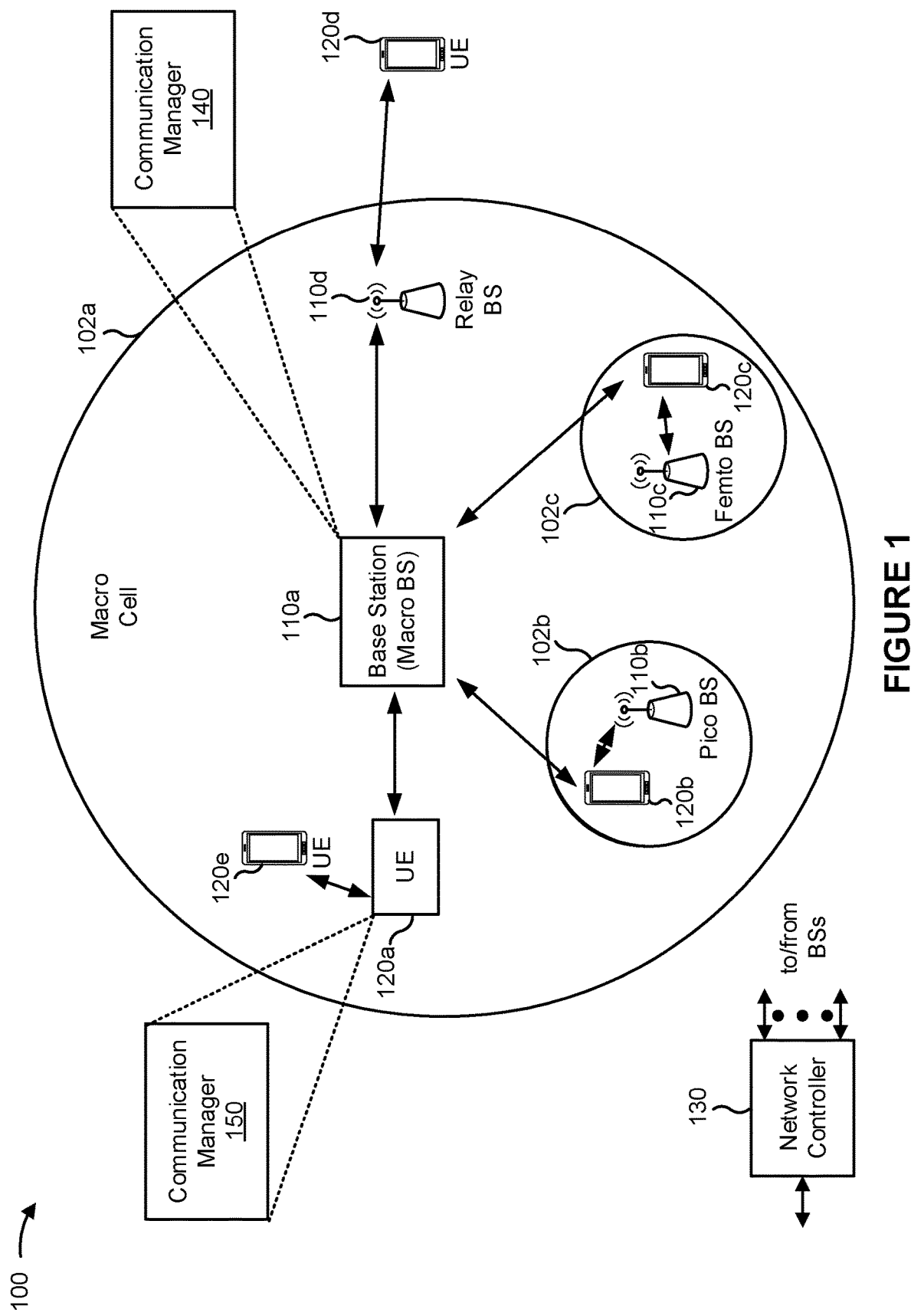
FIG. 1 is a diagram illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), LTE, AMPS, or other known signals that are used to communicate within a wireless, cellular or internet of things (IOT) network, such as a system utilizing 3G technology, 4G technology, 5G technology, or further implementations thereof.

A wireless network may use full-duplex (FD) communication to increase throughput and improve utilization of communication resources. FD communication involves the performance of two or more communications using the same resources. FD communication can be contrasted with half-duplex (HD) communication, in which only one communication is performed on a time and frequency resource. Examples of FD communication include transmission and reception on the same time and frequency resources, as well as transmitting two or more communications on the same time and frequency resources (sometimes referred to as spatial division multiplexing transmission (SDM-TX) or enhanced duplexing). FD communication may involve certain challenges, such as self-interference between a transmission and a concurrent reception, increased power usage which may violate a total transmit power limit of a wireless node, and increased signal to interference plus noise ratio (SINR) requirements at an FD receiver wireless node.

A synchronization signal block (SSB) may be used to perform various tasks in a wireless network, such as synchronization, radio resource management (RRM), radio link control (RLC), beam management, and so on. Generally, a group of SSBs (such as a synchronization signal burst set (SS burst set) or a set of SSBs transmitted by a transmitter wireless node) may be transmitted at a constant power relative to each other. However, in wireless networks utilizing FD communications, a uniform approach to SSB transmit power (where all SSBs are transmitted at the same transmit power) may lead to suboptimal performance. As just one example, a transmit power sufficient to enable reception at an FD-capable receiver wireless node may not be suitable for an FD-capable transmitter wireless node, since this transmit power may cause significant self-interference at an FD-capable transmitter wireless node or may exceed the total transmit power limit of the FD-capable transmitter wireless node.

Some techniques and apparatuses described herein enable transmission of SSBs using adjusted transmit powers. For example, some techniques and apparatuses described herein enable the application of a power offset for one or more sets of SSBs. The power offset may be configured to be applied for a set of SSBs based on a duplexing mode of one or more of a transmitter wireless node (that transmits an SSB) or a receiver wireless node (that receives the SSB). The duplexing mode may be based on whether the transmitter receiver node or the wireless receiver node is operating in an FD mode, or may be based on a resource configuration associated with a resource used to transmit the SSB. Some techniques and apparatuses described herein also provide signaling to support the transmission of SSBs using adjusted transmit powers, and techniques for receiving and processing SSBs that use adjusted transmit powers.

Particular implementations of the subject matter described in this disclosure can be implemented to realize one or more of the following potential advantages. By transmitting SSBs with different transmit powers, self-interference at a transmitter wireless node may be reduced, and the total transmit power limit of the transmitter wireless node may be more consistently satisfied, thereby increasing throughput and improving utilization of wireless communication resources. Furthermore, an acceptable SINR may be achieved at an FD-capable receiver wireless node, thereby increasing throughput and reducing the occurrence of failed SSB reception. Still further, interference at a node other than the transmitter node may be reduced by adjusting the transmit power of SSBs.

FIG. 1 is a diagram illustrating an example of a wireless network 100. The wireless network 100 may be or may include elements of a 5G (for example, New Radio (NR)) network or a 4G (for example, LTE) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (for example, three) cells.

In some examples, a cell may not necessarily be stationary, and the geographic area of the cell may move according to the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110d (for example, a relay base station) may communicate with the BS 110a (for example, a macro base station) and the UE 120d in order to facilitate communication between the BS 110a and the UE 120d. A base station 110 that relays communications may be referred to as a relay station, a relay base station, or a relay.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link. In some aspects, a base station 110 (such as a gNB) or a network controller 130 may be referred to herein as a control node.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, a transmitter wireless node, such as the UE 120 or the base station 110 or one or more other nodes described herein, may include a communication manager 140. As described in more detail elsewhere herein, the communication manager 140 may transmit, in a first duplexing mode, a first SSB with a first transmit power configuration that is associated with the first duplexing mode; and transmit, in a second duplexing mode, a second SSB with a second transmit power configuration that is different than the first transmit power configuration and that is associated with the second duplexing mode. Additionally, or alternatively, the communication manager 140 may perform one or more other operations described herein.

In some aspects, a receiver wireless node, such as the UE 120 or the base station 110 or one or more other nodes described herein, may include a communication manager 150. As described in more detail elsewhere herein, the communication manager 150 may receive an SSB using a transmit power configuration that is associated with a duplexing mode of the SSB; and perform measurement or reporting regarding the SSB. Additionally, or alternatively, the communication manager 150 may perform one or more other operations described herein.

Figure 2:
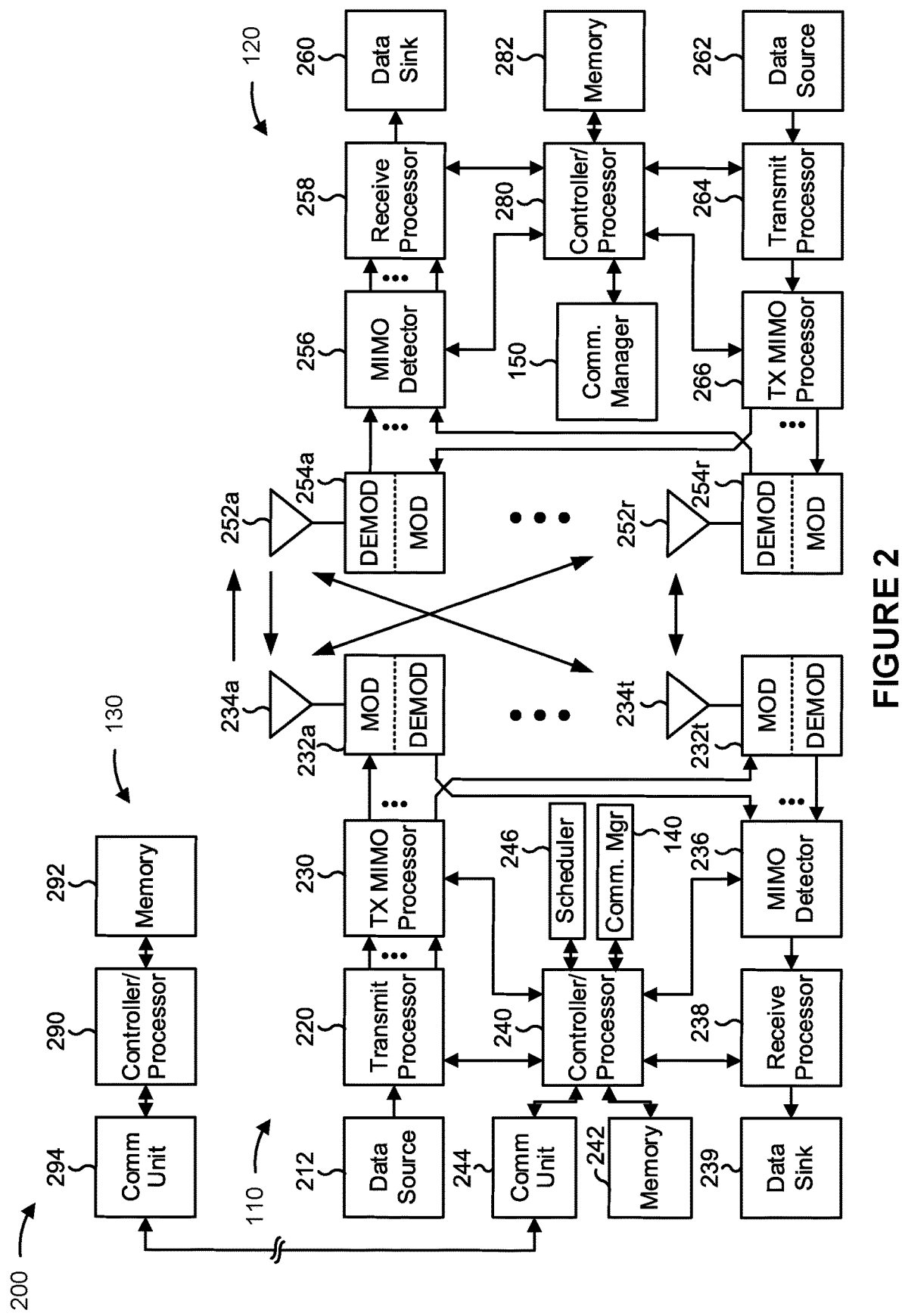
FIG. 2 is a diagram illustrating an example of a base station in communication with a user equipment (UE) in a wireless network.

FIG. 2 is a diagram illustrating an example 200 of a base station 110 in communication with a UE 120 in a wireless network 100. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The UE 120 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the base station 110 or other base stations 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein.

In some implementations, the controller/processor 280 may be a component of a processing system. A processing system may generally refer to a system or series of machines or components that receives inputs and processes the inputs to produce a set of outputs (which may be passed to other systems or components of, for example, the UE 120). For example, a processing system of the UE 120 may refer to a system including the various other components or subcomponents of the UE 120.

The processing system of the UE 120 may interface with other components of the UE 120, and may process information received from other components (such as inputs or signals), output information to other components, etc. For example, a chip or modem of the UE 120 may include a processing system and one or more interfaces, such as a first interface to receive or obtain information, and a second interface to output, transmit or provide information. In some cases, the first interface may refer to an interface between the processing system of the chip or modem and a receiver, such that the UE 120 may receive information or signal inputs, and the information may be passed to the processing system. In some cases, the second interface may refer to an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

In some implementations, the controller/processor 240 may be a component of a processing system. A processing system may generally refer to a system or series of machines or components that receives inputs and processes the inputs to produce a set of outputs (which may be passed to other systems or components of, for example, the base station 110). For example, a processing system of the base station 110 may refer to a system including the various other components or subcomponents of the base station 110.

The processing system of the base station 110 may interface with other components of the base station 110, and may process information received from other components (such as inputs or signals), output information to other components, etc. For example, a chip or modem of the base station 110 may include a processing system and one or more interfaces, such as a first interface to receive, obtain, or select information, and a second interface to output, transmit or provide information. In some cases, the first interface may refer to an interface between the processing system of the chip or modem and a receiver, such that the base station 110 may receive information or signal inputs, and the information may be passed to the processing system. In some cases, the second interface may refer to an interface between the processing system of the chip or modem and a transmitter, such that the base station 110 may transmit information output from the chip or modem. A person having ordinary skill in the art will readily recognize that the second interface also may obtain or receive information or signal inputs, and the first interface also may output, transmit or provide information.

The controller/processor 240 of the base station 110, the controller/processor 280 of the UE 120, or any other component(s) of FIG. 2 may perform one or more techniques associated with transmit power adjustment for an SSB, as described in more detail elsewhere herein. For example, the controller/processor 240 of the base station 110, the controller/processor 280 of the UE 120, or any other component(s) (or combinations of components) of FIG. 2 may perform or direct operations of, for example, process 1000 of FIG. 10, process 1100 of FIG. 11, or other processes as described herein. The memory 242 and the memory 282 may store data and program codes for the base station 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 1000 of FIG. 10, process 1100 of FIG. 11, or other processes as described herein. In some examples, executing instructions may include running the instructions, converting the instructions, compiling the instructions, or interpreting the instructions.

While blocks in FIG. 2 are illustrated as distinct components, the functions described with respect to the blocks may be implemented in a single hardware, software, or combination component or in various combinations of components. For example, the functions described with respect to the transmit processor 264, the receive processor 258, the TX MIMO processor 266, or another processor may be performed by or under the control of the controller/processor 280.

Figure 3:
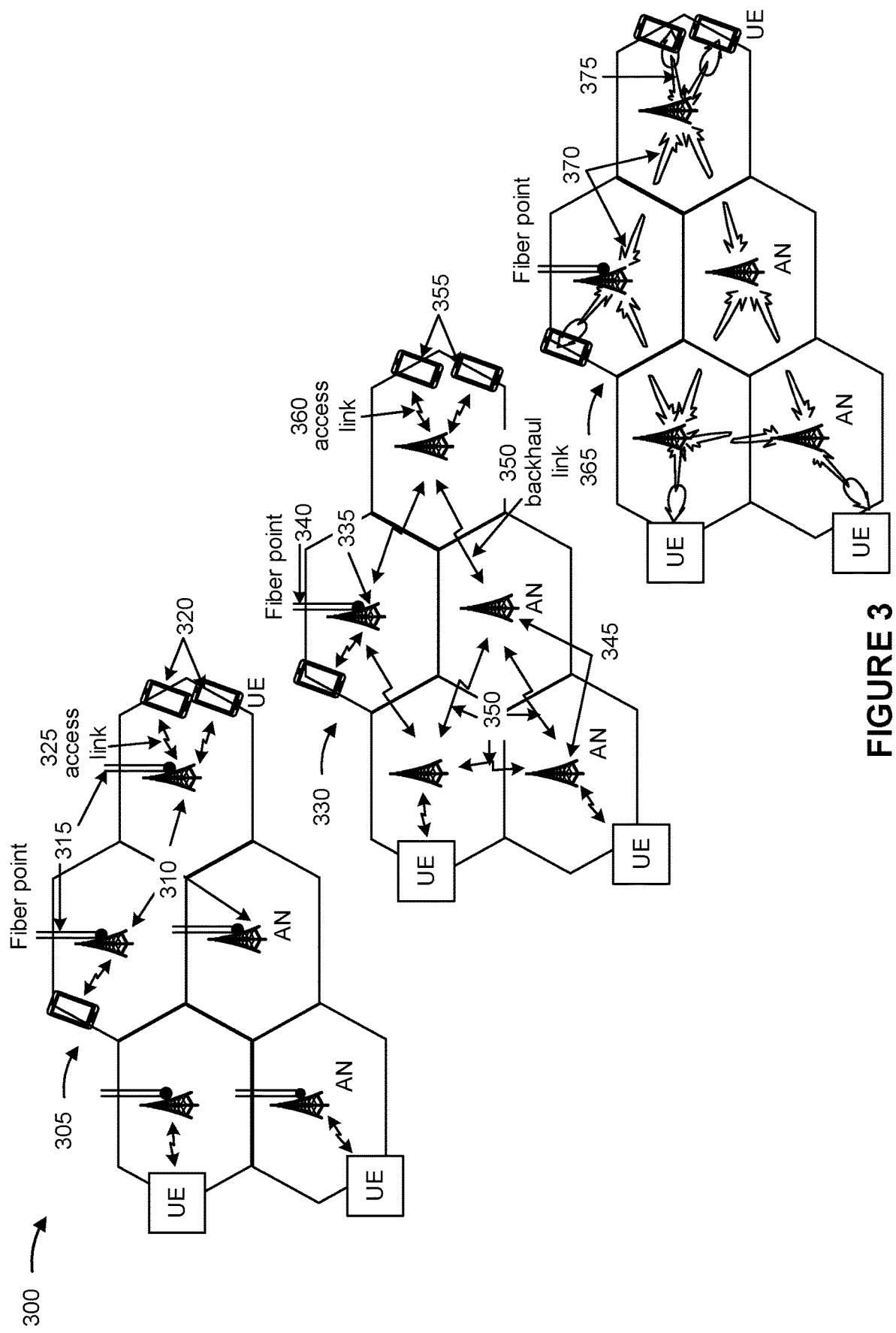
FIG. 3 is a diagram illustrating examples of radio access networks (RANs).

FIG. 3 is a diagram 300 illustrating examples of radio access networks (RANs). As shown by reference number 305, a traditional radio access network (RAN), such as 3G, 4G, LTE, 5G and so on, may include multiple base stations 310 (shown as access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network (RAN) may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (such as via one or more non-anchor base stations 345) to form a backhaul path to the core network for carrying backhaul traffic. Backhaul link 350 may be a wireless link. Anchor base station(s) 335 and non-anchor base station(s) 345 may communicate with one or more UEs 355 via access links 360, which may be wireless links for carrying access traffic. In some aspects, an anchor base station 335 or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology or directional communications (such as beamforming) for communications between base stations and UEs (that is, between two base stations, between two UEs, or between a base station and a UE). For example, wireless backhaul links 370 between base stations may use millimeter wave (mmWave) signals to carry information, and may be directed toward a target base station using beamforming. Similarly, the wireless access links 375 between a UE and a base station may use millimeter wave signals and may be directed toward a target wireless node (such as a UE or a base station) using beamforming. In this way, inter-link interference may be reduced.

Some techniques described herein enable transmission of an SSB using a transmit power configuration that is associated with a duplexing mode of a transmitter wireless node or a receiver wireless node of the SSB. For example, some IAB networks may use FD communication to increase throughput and improve resource utilization. FD communication presents certain challenges, such as self-interference, adherence to transmit power limits during transmission, and maintaining an acceptable SINR at a receiver wireless node operating in an FD mode. By configuring SSBs with different transmit power configurations associated with different duplexing modes, FD communication performance of a transmitter wireless node (such as an anchor base station 335 or a non-anchor base station 345) and a receiver wireless node (such as a non-anchor base station or a UE 355) may be improved.

The configuration of base stations and UEs in FIG. 3 is shown as an example, and other examples are contemplated. For example, one or more base stations illustrated in FIG. 3 may be replaced by one or more UEs that communicate via a UE-to-UE access network (such as a peer-to-peer network or a device-to-device network). In this case, "anchor node" may refer to a UE that is directly in communication with a base station (such as an anchor base station or a non-anchor base station).

Figure 4:
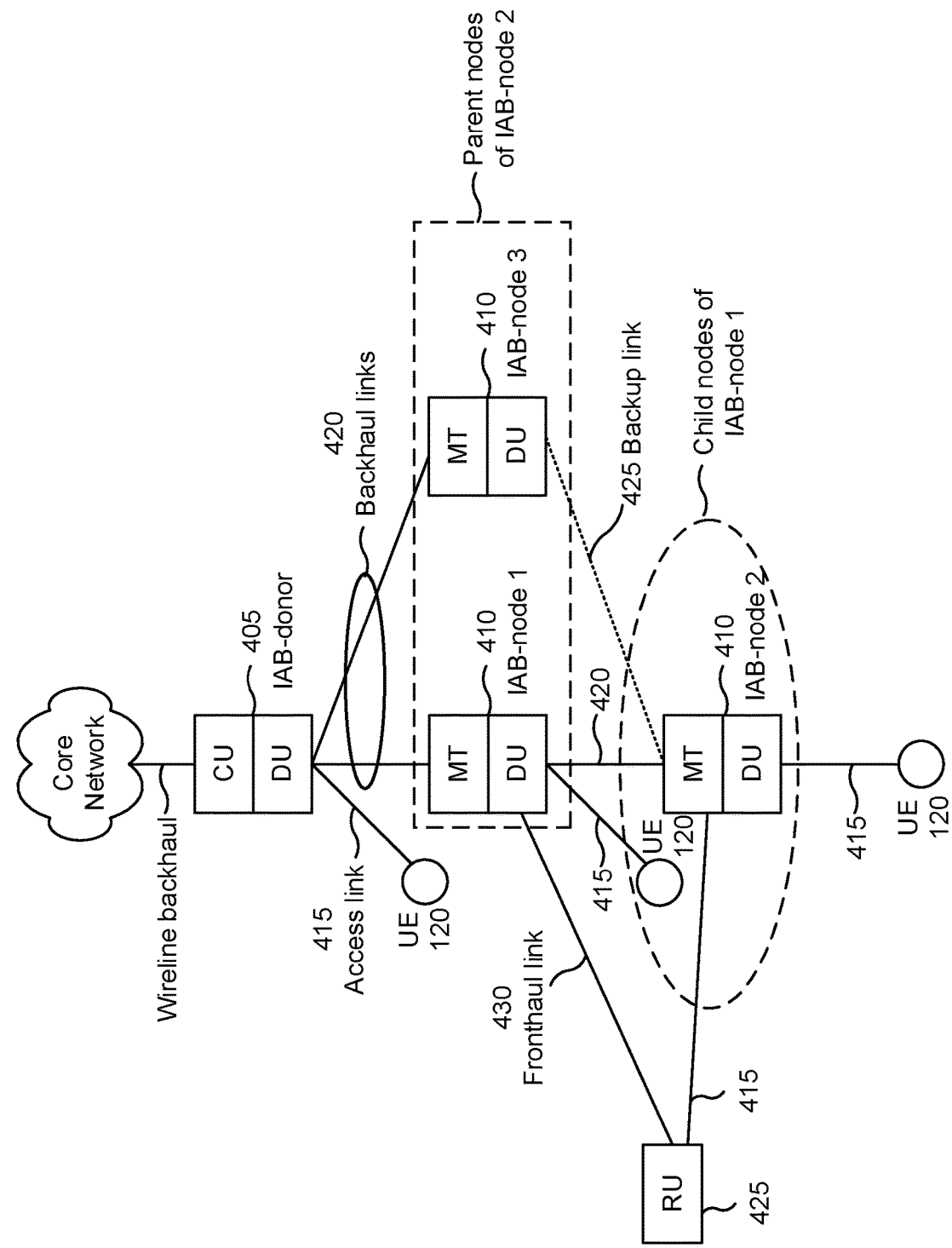
FIG. 4 is a diagram illustrating an example of an integrated access and backhaul (IAB) network architecture.

FIG. 4 is a diagram 400 illustrating an example of an IAB network architecture. As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (AMF). In some aspects, an IAB donor 405 may include a base station 110, such as an anchor base station, as described in connection with FIG. 3. As shown, an IAB donor 405 may include a central unit (CU) (also referred to herein as a central node), which may perform access node controller (ANC) functions and AMF functions. The CU may configure one or more distributed units (DU)s of the IAB donor 405 and may configure one or more IAB nodes 410 (such as an mobile termination (MT) unit or a DU of an IAB node 410) that connect to the core network via the IAB donor 405. In some aspects, the CU may handle configuration of sets of SSBs with different transmit power configurations, resource configurations for a DU or an MT, or other configurations described herein. Thus, a CU of an IAB donor 405 may control and configure the entire IAB network that connects to the core network via the IAB donor 405, such as by using control messages and configuration messages (such as a radio resource control (RRC) configuration message or an F1 application protocol (FLAP) message). In some aspects, the one or more DUs may include an open RAN (O-RAN) DU and an O-RAN radio unit (RU), as described herein. In some aspects, the CU may be referred to herein as a control node.

In some aspects, the IAB network architecture may support O-RAN operability. O-RAN provides for disaggregation of hardware and software, as well as interfacing between hardware and software. In some aspects, O-RAN may use an architecture with a CU (such as a CU of IAB donor 405), one or more DUs (which may be termed an O-RAN DU or O-DU), and one or more RUs (which may be termed an O-RAN RU or O-RU). The RU may perform digital front end functions, some physical layer functions, digital beamforming, and so on. The DU may handle RLC, medium access control (MAC), and some physical (PHY) layer functions. The CU may handle certain gNB functions, such as transfer of user data, mobility control, RAN sharing, positioning, session management, and so on. The CU may control the operation of one or more DUs, and the one or more DUs may control the operation of one or more RUs.

In some aspects, the CU may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU. The CU may be configured to handle user plane functionality (i.e., Central Unit-User Plane (CU-UP)), control plane functionality (i.e., Central Unit-Control Plane (CU-CP)), or a combination thereof. In some implementations, the CU can be logically split into one or more CU-UP units and one or more CU-CP units. The CU can be implemented to communicate with the DU, as necessary, for network control and signaling.

The DU may correspond to a logical unit that includes one or more base station functions to control the operation of one or more RUs. In some aspects, the DU may host one or more of an RLC layer, a MAC layer, and one or more high PHY layers (such as modules for forward error correction (FEC) encoding and decoding, scrambling, modulation and demodulation, or the like) depending, at least in part, on a lower layer functional split. Each layer (or module) can be implemented with an interface configured to communicate signals with other layers (and modules) hosted by the DU, or with the control functions hosted by the CU.

Lower-level functionality can be implemented by one or more RUs. In some deployments, an RU, controlled by a DU, may correspond to a logical node that hosts radio frequency processing functions, or low-PHY layer functions (such as performing fast Fourier transform (FFT), inverse FFT (iFFT), digital beamforming, physical random access channel (PRACH) extraction and filtering, or the like), or both, based on the lower layer functional split. In such an architecture, the RU(s) can be implemented to handle over the air (OTA) communication with a UE 120. In some implementations, real-time and non-real-time aspects of control and user plane communication with the RU(s) can be controlled by the corresponding DU. In some scenarios, this configuration can enable the DU(s) and the CU to be implemented in a cloud-based RAN architecture, such as a virtual RAN (VRAN) architecture.

As further shown in FIG. 4, the JAB network may include JAB nodes 410 (shown as IAB-node 1, IAB-node 2, and IAB-node 3) that connect to the core network via the IAB donor 405. As shown, an JAB node 410 may include MT functions (also sometimes referred to as UE functions (UEF)) and may include DU functions (also sometimes referred to as access node functions (ANF)). The MT functions of an JAB node 410 (referred to as a child node) may be controlled and scheduled by another JAB node 410 (referred to as a parent node of the child node) or by an IAB donor 405. The DU functions of an JAB node 410 (a parent node) may control and schedule other JAB nodes 410 (child nodes of the parent node) and UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and schedule communications of IAB nodes 410 and UEs 120. A UE 120 may include only MT functions, and not DU functions. That is, communications of a UE 120 may be controlled and scheduled by an IAB donor 405 or an JAB node 410 (such as a parent node of the UE 120).

When a first node controls and schedules communications for a second node (such as when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and schedule communications for child nodes of the parent node. A parent node may be an IAB donor 405 or an JAB node 410, and a child node may be an JAB node 410 or a UE 120. Communications of an MT function of a child node may be controlled and scheduled by a parent node of the child node.

As further shown in FIG. 4, a link between a UE 120 (which only has MT functions, and not DU functions) and an IAB donor 405, or between a UE 120 and an JAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (such as time resources, frequency resources, and spatial resources) may be shared between access links 415 and backhaul links 420. In some aspects, a backhaul link 420 may be a primary backhaul link or a secondary backhaul link (also referred to as a backup backhaul link). In some aspects, a secondary backhaul link may be used if a primary backhaul link fails, becomes congested, or becomes overloaded. For example, a backup link between IAB-node 2 and IAB-node 3 may be used for backhaul communications if a primary backhaul link between IAB-node 2 and IAB-node 1 fails. As used herein, "node" or "wireless node" may refer to an IAB donor 405 or an IAB node 410, among other examples described elsewhere herein.

In some aspects, an IAB node 410 (a parent node) may be unable to communicate with another IAB node 410 (a child node) using a direct access link. For example, IAB-node 2 may be outside of a communication range of IAB-node 1 or the direct access link between IAB-node 1 and IAB-node 2 may be blocked. IAB-node 1 may utilize a remote unit (RU) node 425 (such as a relay node or a repeater node) to communicate with IAB-node 2. The IAB-node 1 (that is, the DU of IAB-node 1) may communicate with the RU node 425 using a fronthaul link 430. For example, the IAB-node 1 may transmit a communication to the RU node 425 using the fronthaul link 430. The RU node 425 may forward the communication to the IAB-node 2 using an access link 415 between the IAB-node 2 and the RU node 425. In this way, the IAB-node 1 may extend coverage of the IAB-node 1 and communicate with the IAB-node 2 when the IAB-node 1 is unable to use a direct access link between IAB-node 1 and IAB-node 2 for direct communications. Some techniques described herein enable configuration and transmission of SSBs using different transmit power configurations, such as to improve performance and facilitate successful communication in different duplexing modes.

Figure 5:
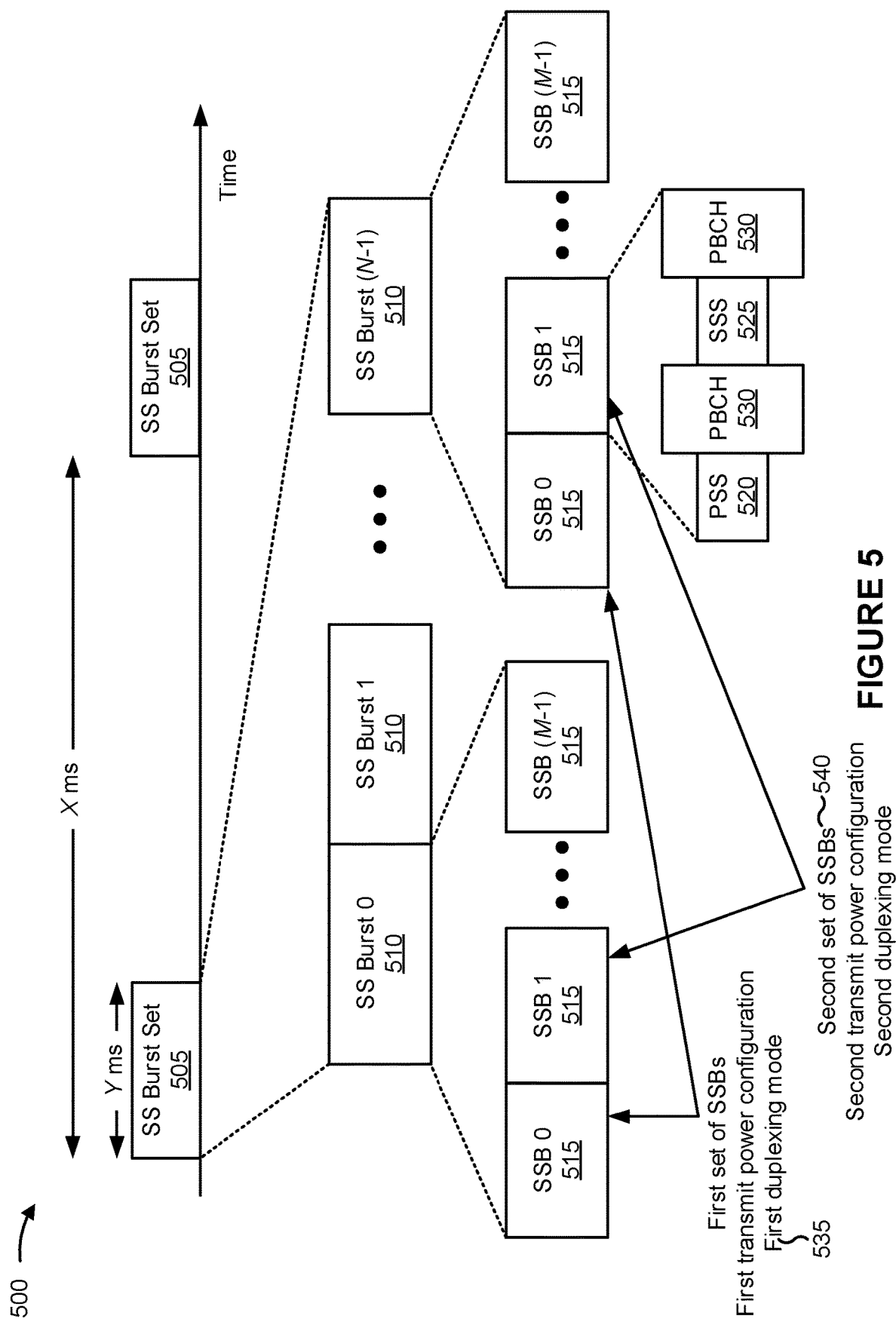
FIG. 5 is a diagram illustrating an example of a synchronization signal (SS) hierarchy.

FIG. 5 is a diagram 500 illustrating an example of a synchronization signal (SS) hierarchy. As shown in FIG. 5, the SS hierarchy may include an SS burst set 505, which may include multiple SS bursts 510, shown as SS burst 0 through SS burst N−1, where N is a maximum number of repetitions of the SS burst 510 that may be transmitted by the base station. As further shown, each SS burst 510 may include one or more SSBs 515, shown as SSB 0 through SSB M−1, where M is a maximum number of SSBs 515 that can be carried by an SS burst 510. In some aspects, different SSBs 515 may be beam-formed differently (for example, transmitted using different beams), and may be used for cell search, cell acquisition, beam management, beam selection (such as part of an initial network access procedure), RRM, radio link monitoring (RLM), or similar operations. A receiver wireless node, such as a UE 120, may perform measurement and reporting of SSBs 515 in association with these operations. An SS burst set 505 may be periodically transmitted by a transmitter wireless node (such as base station 110, an IAB node, an IAB donor, a TRP, or a UE in a sidelink network), such as every X milliseconds, as shown in FIG. 5. In some aspects, an SS burst set 505 may have a fixed or dynamic length, shown as Y milliseconds in FIG. 5. In some cases, an SS burst set 505 or an SS burst 510 may be referred to as a discovery reference signal (DRS) transmission window or an SSB measurement time configuration (SMTC) window. SSBs 515 can also be used for backhaul discovery, such as using an SSB transmission configuration (STC).

In some aspects, an SSB 515 may include resources that carry a PSS 520, an SSS 525, and a physical broadcast channel (PBCH) 530. In some aspects, multiple SSBs 515 are included in an SS burst 510 (with transmission on different beams), and the PSS 520, the SSS 525, and the PBCH 530 may be the same across each SSB 515 of the SS burst 510. In some aspects, a single SSB 515 may be included in an SS burst 510. In some aspects, the SSB 515 may be at least four symbols (such as OFDM symbols) in length, where each symbol carries one or more of the PSS 520 (occupying one symbol), the SSS 525 (occupying one symbol), or the PBCH 530 (occupying two symbols). In some aspects, an SSB 515 may be referred to as an SS/PBCH block.

In some aspects, the symbols of an SSB 515 are consecutive, as shown in FIG. 5. In some aspects, the symbols of an SSB 515 are non-consecutive. Similarly, in some aspects, one or more SSBs 515 of the SS burst 510 may be transmitted in consecutive radio resources (such as consecutive symbols) during one or more slots. Additionally, or alternatively, one or more SSBs 515 of the SS burst 510 may be transmitted in non-consecutive radio resources.

In some aspects, the SS bursts 510 may have a burst period, and the SSBs 515 of the SS burst 510 may be transmitted by a transmitter wireless node according to the burst period. In this case, the SSBs 515 may be repeated during each SS burst 510. In some aspects, the SS burst set 505 may have a burst set periodicity, whereby the SS bursts 510 of the SS burst set 505 are transmitted by the wireless node according to the fixed burst set periodicity. In other words, the SS bursts 510 may be repeated during each SS burst set 505.

In some aspects, an SSB 515 may include an SSB index, which may correspond to a beam used to carry the SSB 515. A receiver wireless node (such as a UE 120, a base station, or an IAB node) may monitor for and measure SSBs 515 using different receive (Rx) beams during an initial network access procedure or a cell search procedure, among other examples. Based on the monitoring and measuring, the receiver wireless node may indicate one or more SSBs 515 with a best signal parameter (such as an RSRP parameter, in some examples) to a transmitter wireless node. The transmitter wireless node and the receiver wireless node may use the one or more indicated SSBs 515 to select one or more beams to be used for communication between the transmitter wireless node and the receiver wireless node (such as for a random access channel (RACH) procedure). Additionally, or alternatively, the receiver wireless node may use the SSB 515 or the SSB index to determine a cell timing for a cell via which the SSB 515 is received (for example, a serving cell).

Some SSBs 515 may be transmitted in a full-duplex mode, whereas other SSBs 515 may be transmitted in a half-duplex mode. As described elsewhere herein, a full-duplex mode can refer to a transmitter wireless node performing FD communication or to a receiver wireless node performing FD communication. If SSBs are transmitted with the same transmit power, then self-interference may occur at a transmitter wireless node operating in an FD mode. Additionally, the transmission of an SSB in a full-duplex mode may cause the transmitter wireless node to exceed a total transmit power limit since the SSB may be associated with a predetermined transmit power while some amount of the transmitter wireless node's power budget is in use for another transmission. Additionally, if all SSBs are transmitted with the same transmit power, then a receiver wireless node in an FD mode may not receive an SSB at sufficient signal strength (such as with a sufficient SINR) to measure and report the SSB. Techniques described herein enable the transmission of SSBs 515 using different transmit power configurations, such as different power offsets relative to each other or to a baseline. For example, in FIG. 5, as shown by reference number 535, a first set of SSBs 515 (including at least SSB index 0) is transmitted with a first transmit power, corresponding to a first duplexing mode. As shown by reference number 540, a second set of SSBs 515, including at least SSB index 1, is transmitted with a second transmit power corresponding to a second duplexing mode. Thus, reception signal strength at an FD-mode receiver wireless node may be improved, and self-interference or transmit power limit violation at an FD-mode transmitter wireless node may be reduced.

Figure 6:
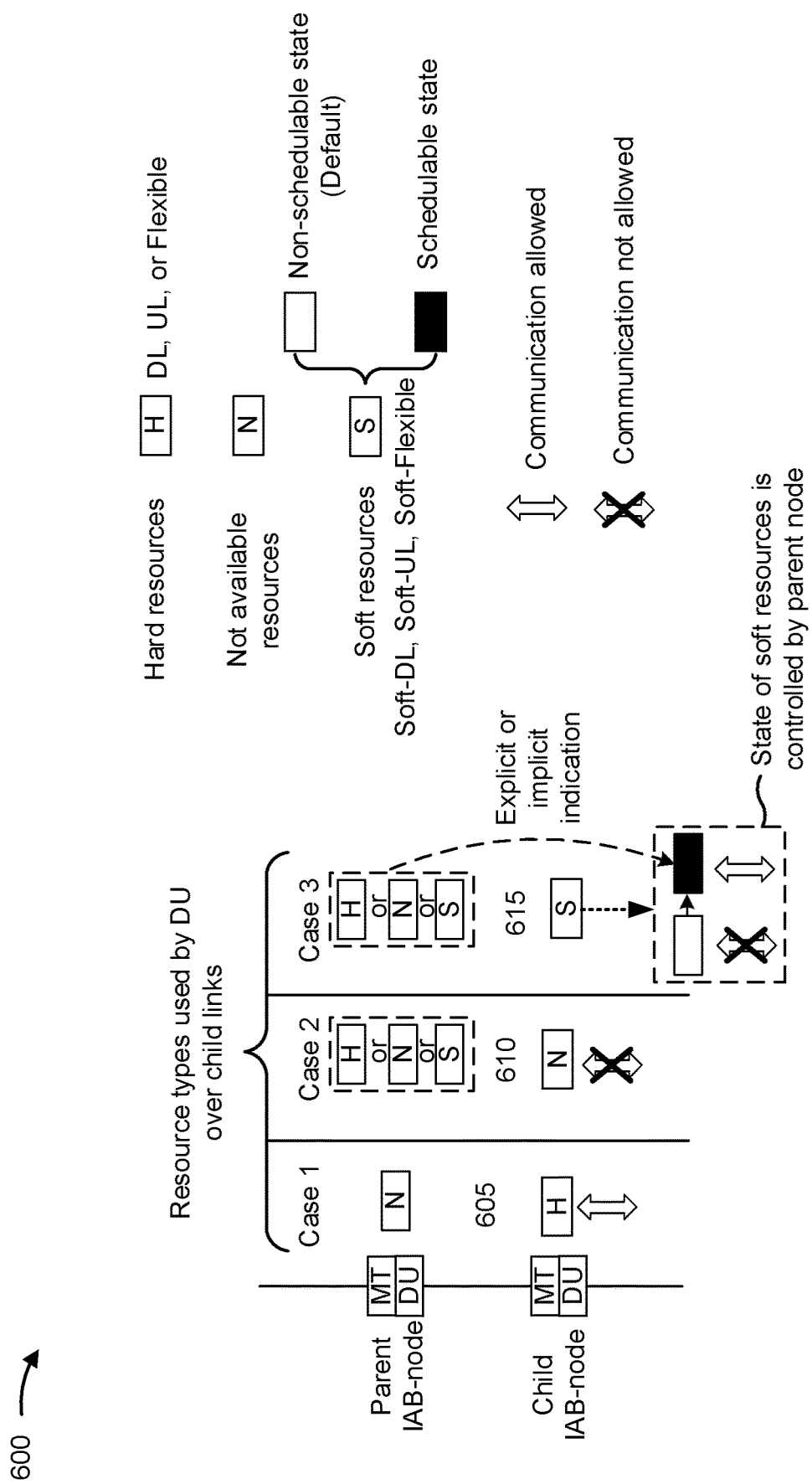
FIG. 6 is a diagram illustrating an example of resource types in an IAB network.

FIG. 6 is a diagram 600 illustrating an example of resource types in an IAB network. In an IAB network, resources (sometimes referred to as time resources) may be configured as downlink-only, uplink-only, flexible, or not available (sometimes referred to as "unavailable"). For example, these resources may include time resources, frequency resources, spatial resources, or a combination thereof. When a resource is configured as downlink-only for a wireless node, that resource may be available for only downlink communications of the wireless node, and not uplink communications. Similarly, when a resource is configured as uplink-only for a wireless node, that resource may be available for only uplink communications of the wireless node, and not downlink communications. When a resource is configured as flexible for a wireless node, that resource may be available for both downlink communications and uplink communications of the wireless node. When a resource is configured as not available for a wireless node, that resource may not be used for any communications of the wireless node. In some cases, a resource can be configured as an FD resource for a wireless node, meaning that that resource is available for FD communication of that wireless node.

Examples of downlink communications include SSBs (such as SSB 515 depicted and described in FIG. 5), channel state information reference signals (CSI-RS), physical downlink control channel (PDCCH) communications, and physical downlink shared channel (PDSCH) communications. Examples of uplink communications include PRACH communications, physical uplink control channel (PUCCH) communications, physical uplink shared channel (PUSCH) communications, and sounding reference signals (SRSs).

Resources in an IAB network that are configured as downlink-only, uplink-only, or flexible may be further configured as hard resources or soft resources. A hard resource is a resource that is always available for communications of a given wireless node. A soft resource is conditionally available for a wireless node based on signaling from a parent node of the wireless node. A given resource is configured as a hard resource or a soft resource from the perspective of a given wireless node. For example, a given resource can be a hard resource for one wireless node (such as a parent node) and a soft resource for another wireless node (such as a child node of the parent node).

When a resource is configured as a hard resource for a wireless node, that resource is always available for communications of the wireless node. For example, a hard downlink-only resource is always available for only downlink communications of the wireless node, a hard uplink-only resource is always available for only uplink communications of the wireless node, and a hard flexible resource is always available for uplink and downlink communications of the wireless node.

When a resource is configured as a soft resource for a wireless node, the availability of that resource is controlled by a parent node of the wireless node. For example, the parent node may indicate (explicitly or implicitly) whether a soft resource is available for communications of the wireless node. Thus, a soft resource may be in one of two states: a schedulable state (when the soft resource is available for scheduling or communications of the wireless node) and a non-schedulable state (when the soft resource is not available for scheduling and is not available for communications of the wireless node).

For example, a soft downlink-only resource is only available for downlink communications of the wireless node when a parent node of the wireless node indicates that the soft downlink-only resource is available. Similarly, a soft uplink-only resource is only available for uplink communications of the wireless node when a parent node of the wireless node indicates that the soft uplink-only resource is available. A soft flexible resource is only available for uplink and downlink communications of the wireless node when a parent node of the wireless node indicates that the soft flexible resource is available.

As an example, and as shown by reference number 605, a resource may be configured as hard for a child node and may be configured as not available for a parent node of the child node. In this case, the parent node cannot communicate using that resource, but the child node can schedule communications in that resource or communicate using that resource. This configuration may reduce interference between the parent node and the child node and may reduce scheduling conflicts between the parent node and the child node.

As another example, and as shown by reference number 610, a resource may be configured as not available for the child node, and may be configured as hard, soft, or not available for the parent node (depending on a network configuration, network conditions, or a configuration of a parent node of the parent node). In this case, the child node cannot schedule communications in that resource and cannot communicate using that time resource.

As another example, and as shown by reference number 615, a resource may be configured as soft for the child node, and may be configured as hard, soft, or not available for the parent node (depending on a network configuration, network conditions, or a configuration of a parent node of the parent node). In this case, the child node cannot schedule or communicate using the resource unless the child node receives an indication (a release indication), from the parent node (explicitly or implicitly), that the resource is available (that is, released) for use by the child node. If the child node receives such an indication, then the child node can schedule communications in that resource or communicate using that resource.

The configuration of resources as hard/soft/unavailable or uplink/downlink/flexible/FD may be referred to herein as a resource configuration (though "resource configuration" can also refer to other types of configurations, as described elsewhere herein). In some cases, a set of SSBs (which may be configured with a transmit power configuration indicating a power offset) may be associated with a set of resources based on a resource configuration of the set of resources. For example, a transmitter wireless node may transmit an SSB using the transmit power configuration if the SSB is to be transmitted on a resource having a resource configuration, or overlapping with a resource having a resource configuration, that is associated with (such as configured with) the transmit power configuration.

Figure 7:
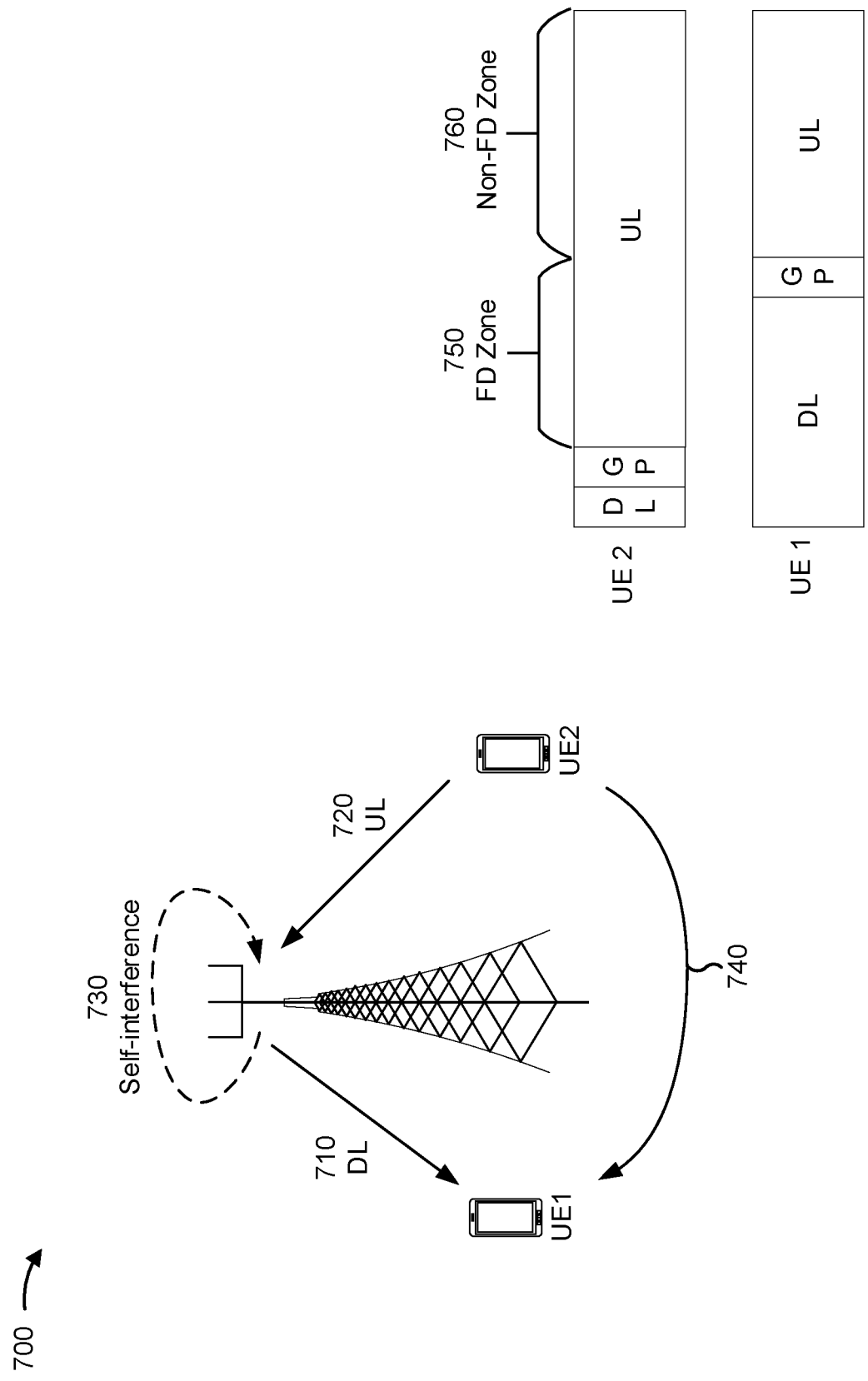
FIG. 7 is a diagram illustrating an example of an FD zone, a non-FD zone, and self-interference associated with FD communications.

FIG. 7 is a diagram illustrating an example of an FD zone, a non-FD zone, and self-interference associated with FD communications. As shown, example 700 includes a BS (such as BS 110, the base station 335 or 345 of FIG. 3, or a transmitter wireless node), a UE1 (such as UE 120, an MT of an IAB node, or a receiver wireless node), and a UE2 (such as UE 120, an MT of an IAB node, or a receiver wireless node). In some aspects, the BS may be capable of FD communication. FD communication may include a contemporaneous uplink and downlink communication using the same resources. For example, the BS may perform a downlink (DL) transmission to a UE1 (shown by reference number 710) and may receive an uplink (UL) transmission from a UE2 (shown by reference number 720) using the same frequency resources and at least partially overlapping in time.

In one example, an FD BS may configure or schedule uplink signals (such as RACH signals, a PUCCH, a PUSCH, or a sounding reference signal) on time resources that overlap with an SSB (such as SSB 515) to be transmitted by the FD BS. In another example, in an IAB network, a DU's SSBs may overlap, in time, with transmission or reception by a co-located MT.

As shown by reference number 730, the DL transmission from the BS may self-interfere with the UL transmission to the BS. This may be caused by a variety of factors, such as the higher transmit power for the DL transmission (as compared to the UL transmission) or radio frequency bleeding. Furthermore, as shown by reference number 740, the UL transmission to the BS from the UE2 may interfere with the DL transmission from the BS to the UE1, thereby diminishing DL performance of the UE1.

An FD zone is shown by reference number 750 and a non-FD zone is shown by reference number 760. An "FD zone" may refer to one or more of a time period or a frequency region in which a wireless communication device (such as a BS 110, a UE 120, a wireless node, or a similar device) performs FD communication, and a "non-FD zone" may refer to one or more of a time period or a frequency region in which a wireless communication device performs non-FD communication. The FD zone may be associated with higher self-interference, and therefore a lower SINR, than the non-FD zone. A base station operating in the FD zone may be referred to herein as operating in an FD mode, and a base station operating in the non-FD zone may be referred to herein as operating in a non-FD mode.

Some receiver wireless nodes can operate in an FD mode, in which the receiver wireless node transmits a communication and receives a communication on the same resources. A receiver wireless node that can operate in an FD mode is referred to as being FD capable. For example, a receiver wireless node may be capable of both FD mode operation (in which the receiver wireless node performs FD communication in an FD zone) and HD mode operation (in which the receiver wireless node performs only HD communications). Some receiver wireless nodes may be capable of only HD mode operation. In some aspects, a set of SSBs (such as SSB 515) may be configured for a duplexing mode, such as an FD mode at a transmitter wireless node, an FD mode at a receiver wireless node, an HD mode at a transmitter wireless node, or an HD mode at a receiver wireless node. For example, one or more of these duplexing modes may be configured with a set of SSBs having a decreased transmit power configuration to reduce self-interference or transmit power limit violation (in an FD zone), or having an increased transmit power configuration to provide an acceptable SINR for an FD receiver wireless node in an FD zone.

Figure 8:
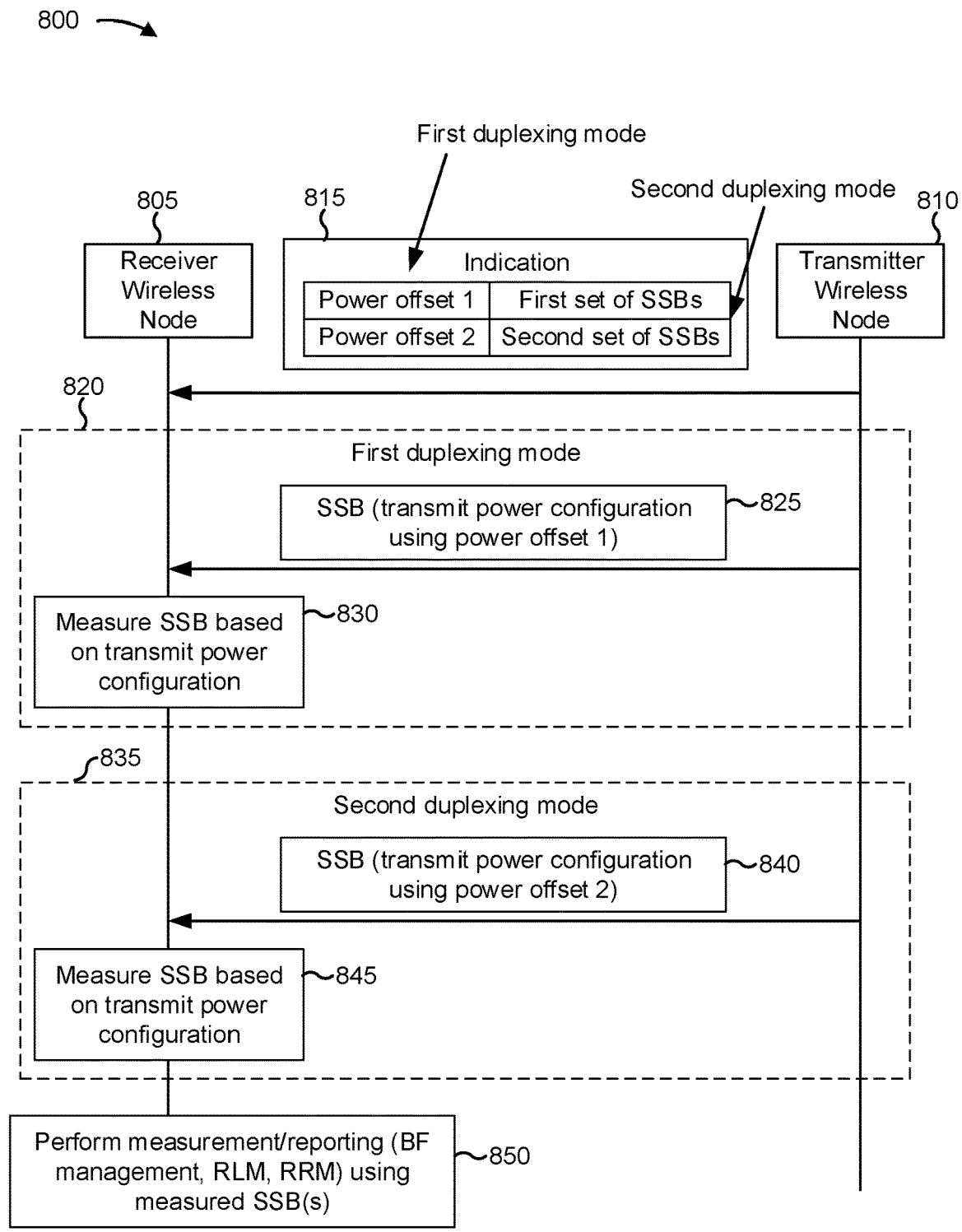
FIG. 8 is a diagram illustrating an example of SSB transmit power configuration using explicit indication.

FIG. 8 is a diagram 800 illustrating an example of SSB transmit power configuration using explicit indication. As shown, FIG. 8 includes a receiver wireless node 805 (such as the UE 120 or the base station 110 of FIG. 1, a TRP, the non-anchor base station 345 or the UE 355 of FIG. 3, an MT or a DU of an IAB-node 410 of FIG. 4, a child IAB-node of FIG. 6, or a UE as described in FIG. 7) and a transmitter wireless node 810 (such as the UE 120 or the base station 110 of FIG. 1, a TRP, the anchor base station 335 or the non-anchor base station 345 of FIG. 3, a DU of an IAB-donor 405 or an IAB-node 410 of FIG. 4, a parent IAB-node of FIG. 6, or a base station as described in FIG. 7). In some aspects, the transmitter wireless node and the receiver wireless node may be UEs and may communicate using a sidelink or device-to-device (D2D) protocol. In some aspects, the transmitter wireless node and the receiver wireless node may be IAB nodes (such as an IAB-donor or an IAB-node) of an IAB network. In some aspects, the transmitter wireless node and the receiver wireless node may be base stations performing backhaul discovery. In some aspects, the transmitter wireless node may be a base station 110, and the receiver wireless node may be a UE 120 operating in a radio access network (such as performing uplink and downlink communications).

As shown by reference number 815, the receiver wireless node may receive an indication of one or more transmit power configurations for one or more sets of SSBs. As shown, a transmit power configuration may include a power offset for transmission of an SSB and may indicate a set of SSBs for which the power offset is to be used. For example, the transmit power configuration may be mapped to the set of SSBs. The power offset can be relative to another SSB or can be relative to a baseline transmit power. In some aspects, the indication of the one or more transmit power configurations may indicate an absolute transmit power (such as without using a power offset). The receiver wireless node may use the indication to perform monitoring, measurement, or reporting of received SSBs, as described elsewhere herein. In some aspects, the receiver wireless node may determine the indication. "Obtaining the indication" may refer to receiving the indication, to determining the indication, to ascertaining the indication, or to selecting the indication.

In the example of FIG. 8, the receiver wireless node receives the indication from the transmitter wireless node, which is the node that will transmit one or more SSBs in accordance with the one or more transmit power configurations. In some other aspects, the receiver wireless node may receive the indication from a control node, such as a gNB, a CU that configures a DU of the transmitter wireless node and an MT of the receiver wireless node, or (if the communicating wireless nodes are UEs) a UE or road-side unit. The receiver wireless node may receive the indication via remaining minimum system information (RMSI) (such as via system information block 1 (SIB1)), an SIB other than SIB1, dedicated radio resource control (RRC) signaling, a group-common message (such as downlink control information), a functional split (F1) interface message, an STC associated with backhaul discovery, dedicated downlink control information, or another form of signaling.

In some aspects, a wireless node may receive the indication via a backhaul connection. For example, a DU of the transmitter wireless node may receive the indication of the sets of SSBs (or the transmit power configuration), such as via a logical interface between the DU and a CU. In some aspects, a DU (such as a DU of the transmitter wireless node) may provide the indication to a CU. For example, the DU may indicate one or more selected transmit power configurations (selected by the DU) for one or more sets of SSBs.

The indication may define one or more sets of SSBs. In the example of FIG. 8, the indication defines two sets of SSBs. For example, the sets of SSBs may be defined explicitly. For example, the indication may include one or more SSB bitmaps. A bitmap for a set of SSBs may include multiple bits corresponding to multiple SSBs. A bit set to a first value may indicate that a corresponding SSB (such as a corresponding SSB index) belongs to a set of SSBs, and the bit set to a second value may indicate that the corresponding SSB does not belong to the set of SSBs. In some aspects, the indication may include one bitmap per set of SSBs defined by the indication. In some aspects, the bitmap may be of a size equal to a total number of SSB candidates within an SS burst set (such as a value of $L_{max}$, which may be based on a carrier frequency or band). For example, the bitmap may include $L_{max}$ bits. In some other aspects, the bitmap may be of a size equal to a number of transmitted SSBs or a number of configured SSBs. For example, in some cases, a transmitter wireless node may transmit fewer than $L_{max}$ SSBs. In this case, the bitmap may include a number of bits equal to a number of SSBs to be transmitted in an SS burst set. In some aspects, the indication may include information identifying a set of SSB indices. For example, the indication may explicitly identify each SSB index to be included in a set of SSBs.

As further shown, a set of SSBs may be associated with a duplexing mode. In some aspects, the indication may indicate the duplexing mode. For example, the indication may indicate that a transmitter wireless node operating in a given duplexing mode, or a transmitter wireless node transmitting an SSB for a receiver wireless node operating in a given duplexing mode, should transmit an SSB using a given transmit power configuration. In this example, the transmitter wireless node may determine which transmit power configuration to use for an SSB based on the duplexing mode. In some other aspects, the indication may not explicitly indicate the duplexing mode. For example, the transmitter wireless node may transmit an SSB belonging to a set of SSBs with a corresponding transmit power configuration without regard for which duplexing mode is in use by the transmitter wireless node or the receiver wireless node.

The duplexing mode may include, for example, an HD mode (associated with transmitting an SSB in an HD fashion), a transmitter-side FD mode (associated with transmitting an SSB in an FD fashion at the transmitter wireless node), a receiver-side FD mode (associated with transmitting an SSB to be received by the receiver wireless node in an FD fashion), and an IAB mode (where a resource for transmission of the SSB by a DU overlaps with a resource for communication by a co-located MT). As mentioned, different sets of SSBs may be configured for different duplexing modes.

In some implementations, the transmit power configuration may provide an increased transmit power for an SSB transmitted to an FD-capable receiver wireless node, such as an FD UE. Thus, the SSB may achieve an SINR at the receiver wireless node that enables successful reception of the SSB. In some other implementations, the transmit power configuration may provide a decreased transmit power for an SSB transmitted by an FD-capable transmitter wireless node. Thus, self-interference at the transmitter wireless node may be reduced and a total transmit power limit of the transmitter wireless node may be satisfied.

Reference number 820 shows SSB transmission while one or more of the receiver wireless node or the transmitter wireless node are in a first duplexing mode. The first duplexing mode may include, for example, an HD mode, a transmitter-side FD mode, a receiver-side FD mode, an IAB mode, or another form of mode. In some aspects, the duplexing mode may be based on whether the SSB is transmitted in an FD zone (of the transmitter wireless node or the receiver wireless node). In some aspects, illustrated and described in connection with FIG. 9, the duplexing mode is based on a resource configuration of a resource used to transmit the SSB or a resource that overlaps the resource used to transmit the SSB.

As shown by reference number 825, the transmitter wireless node may transmit an SSB in accordance with a transmit power configuration. For example, the transmit power configuration may use a power offset configured for the first set of SSBs (power offset 1) based on the first set of SSBs being associated with the first duplexing mode. As shown by reference number 830, the receiver wireless node may measure the SSB based on the transmit power configuration. For example, the receiver wireless node may assume an adjusted transmit power (defined by power offset 1) for the purpose of beam management, RLM, RRM or the like. If measurements based on multiple SSB instances with different transmit power configurations are to be combined (such as for filtering purposes), then the receiver wireless node may adjust (such as normalize) measurements of the multiple SSB instances in accordance with the different transmit power configurations. In some aspects, if an SSB has an adjusted transmit power that is lower than a threshold, then the receiver wireless node may skip reception of the SSB in an evaluation period for the measurement or reporting. In such examples, a length of the evaluation period may be extended. For example, the length of the evaluation period may be extended based on how many measurement occasions are to be skipped (such as by a factor of 2, a factor of 3, or another factor).

Reference number 835 shows SSB transmission while one or more of the receiver wireless node or the transmitter wireless node are in a second duplexing mode. The second duplexing mode may include, for example, an HD mode, a transmitter-side FD mode, a receiver-side FD mode, an IAB mode, or another form of mode. In some aspects, the duplexing mode may be based on whether the SSB is transmitted in an FD zone (of the transmitter wireless node or the receiver wireless node).

As shown by reference number 840, the transmitter wireless node may transmit another SSB in accordance with a transmit power configuration. For example, the transmit power configuration may use a power offset configured for the second set of SSBs (power offset 2) based on the second set of SSBs being associated with the second duplexing mode. As shown by reference number 845, the receiver wireless node may measure the SSB based on the transmit power configuration. For example, the receiver wireless node may assume an adjusted transmit power (defined by power offset 2) for the purpose of beam management, RLM, RRM or the like. If measurements based on multiple SSB instances with different transmit power configurations are to be combined (such as for filtering purposes), then the receiver wireless node may adjust (such as normalize) measurements of the multiple SSB instances in accordance with the different transmit power configurations. In some aspects, if an SSB has an adjusted transmit power that is lower than a threshold, then the receiver wireless node may skip reception of the SSB in an evaluation period. In such examples, the receiver wireless node may extend a length of the evaluation period.

As shown by reference number 850, the receiver wireless node may perform measurement or reporting regarding one or more SSBs. For example, the receiver wireless node may perform measurements as described with regard to reference numbers 830 and 845. As another example, the receiver wireless node may transmit a report indicating a beam failure detection. As still another example, the receiver wireless node may transmit a report indicating a selected beam for beam failure recovery. As yet another example, the receiver wireless node may transmit an indication of radio link failure, an indication of radio link quality, an in-sync/out-of-sync indication, or a similar message. As another example, the receiver wireless node may select a suitable cell for camping, may perform cell reselection, may perform inactive mobility control, or a similar operation. As yet another example, the receiver wireless node or the transmitter wireless node may perform a handover, an RRC reestablishment, an RRC connection release with redirection, or a similar operation.

Figure 9:
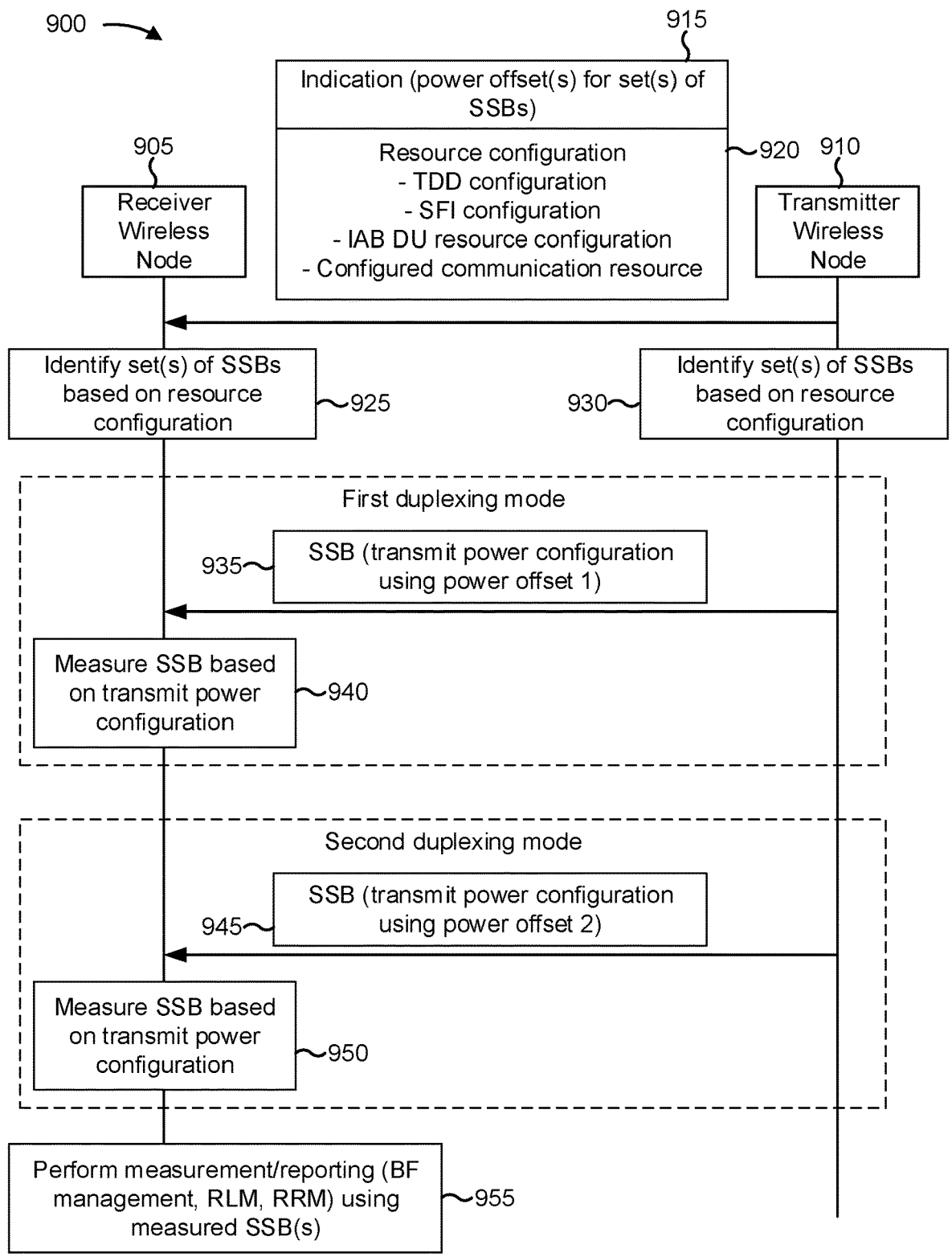
FIG. 9 is a diagram illustrating an example of SSB transmit power configuration using implicit indication.

FIG. 9 is a diagram 900 illustrating an example of SSB transmit power configuration using implicit indication. As shown, FIG. 9 includes a receiver wireless node 905 (such as the UE 120 or the base station 110 of FIG. 1, the non-anchor base station 345 or the UE 355 of FIG. 3, an MT or a DU of an IAB-node 410 of FIG. 4, a child IAB-node of FIG. 6, or a UE as described in FIG. 7) and a transmitter wireless node 910 (such as the UE 120 or the base station 110 of FIG. 1, the anchor base station 335 or the non-anchor base station 345 of FIG. 3, a DU of an IAB-donor 405 or an IAB-node 410 of FIG. 4, a parent IAB-node of FIG. 6, or a base station as described in FIG. 7). In some aspects, the transmitter wireless node and the receiver wireless node may be UEs and may communicate using a sidelink or device-to-device protocol. In some aspects, the transmitter wireless node and the receiver wireless node may be IAB nodes (such as an IAB-donor or an IAB-node) of an IAB network. In some aspects, the transmitter wireless node and the receiver wireless node may be base stations performing backhaul discovery. In some aspects, the transmitter wireless node may be a base station 110 and the receiver wireless node may be a UE 120 of a radio access network (such as performing uplink and downlink communication).

As shown by reference number 915, the transmitter wireless node may provide an indication of one or more transmit power configurations (such as one or more power offsets) for one or more sets of SSBs. For example, the indication may indicate a transmit power configuration and may map the transmit power configuration to a set of SSBs. In the example of FIG. 9, a set of SSBs may be defined based on a resource configuration. For example, the indication (or other information) may indicate a particular resource configuration, and an SSB that satisfies the particular resource configuration may belong to a set of SSBs associated with the particular resource configuration. In this case, the indication may indicate a transmit power configuration (such as a power offset) and a corresponding resource configuration for SSBs that are to utilize the transmit power configuration.

As shown by reference number 920, the receiver wireless node may receive information indicating resource configurations for resources for communication between the receiver wireless node and the transmitter wireless node. In some aspects, the receiver wireless node may receive this information from the transmitter wireless node, as shown. In some other aspects, the receiver wireless node may receive this information from another node, such as a CU. In some aspects, a resource configuration may include a time division duplexing (TDD) configuration, such as a TDDconfigCommon parameter, a dedicated TDD configuration, or a cell-specific TDD configuration. In some aspects, a resource configuration may include a slot format indication (SFI) configuration. In some aspects, a resource configuration may include an IAB DU resource configuration (which may configure a resource as hard/soft/unavailable, or which may indicate a TDD pattern for an IAB DU resource). In some aspects, the resource configuration may indicate a combination of these configurations for one or more resources.

As shown by reference numbers 925 and 930, the receiver wireless node and the transmitter wireless node may identify one or more sets of SSBs based on resource configurations. For example, the receiver wireless node or the transmitter wireless node may determine that a resource for transmitting (or receiving) an SSB has a particular resource configuration identified by the indication, or may determine that a resource for transmitting (or receiving) an SSB overlaps a resource that has the particular resource configuration identified by the indication.

As one example, the indication may indicate that an SSB overlapping with a downlink resource belongs to a particular set of SSBs. As another example, the indication may indicate that an SSB overlapping with an uplink resource belongs to a particular set of SSBs. As yet another example, the indication may indicate that an SSB overlapping with a flexible resource belongs to a particular set of SSBs. As still another example, the indication may indicate that an SSB overlapping with a full-duplex or bidirectional resource may belong to a particular SSB.

In some aspects, such as for an IAB network, the indication may indicate that SSBs within hard, not available, and soft resources may be associated with different sets of SSBs. Additionally, or alternatively, SSBs on resources overlapping with resources allocated to a parent IAB-node or a child IAB-node of the transmitter wireless node may be assigned to a first set of SSBs, and SSBs within exclusively resources allocated to the transmitter wireless node may be assigned to a second set of SSBs.

In some aspects, the resource configuration may indicate a configured communication resource. For example, the resource configuration may be a semi-static (such as RRC) configuration of a configured communication. As just one example, the resource configuration may indicate a RACH occasion (RO) associated with transmitting a RACH message for a RACH procedure. In some aspects, an SSB that overlaps with a configured communication resource may be associated with a particular set of SSBs.

As shown by reference number 935, the transmitter wireless node may transmit an SSB using a transmit power configuration associated with a first duplexing mode. The transmitter wireless node may transmit the SSB using the transmit power configuration associated with a first set of SSBs. The transmitter wireless node may determine that the SSB is to be transmitted using the transmit power configuration associated with the first set of SSBs (that is, associated with the first duplexing mode) based on a resource of the SSB, or a resource with which the resource of the SSB is overlapped, being associated with a resource configuration that maps to the first set of SSBs. As shown by reference number 940, the receiver wireless node may measure the SSB based on the transmit power configuration associated with the first set of SSBs.

As shown by reference number 945, the transmitter wireless node may transmit another SSB using a transmit power configuration associated with a second duplexing mode. The transmitter wireless node may transmit the SSB using the transmit power configuration associated with a second set of SSBs. The transmitter wireless node may determine that the SSB is to be transmitted using the transmit power configuration associated with the second set of SSBs (that is, associated with the first duplexing mode) based on a resource of the SSB, or a resource with which the resource of the SSB is overlapped, being associated with a resource configuration that maps to the second set of SSBs. As shown by reference number 950, the receiver wireless node may measure the SSB based on the transmit power configuration associated with the second set of SSBs.

As shown by reference number 955, the receiver wireless node may perform measurement or reporting regarding one or more SSBs. For example, the receiver wireless node may perform measurements as described with regard to reference numbers 830 and 845 of FIG. 8, or with regard to reference numbers 940 and 950 of FIG. 9. As another example, the receiver wireless node may transmit a report indicating a beam failure detection. As still another example, the receiver wireless node may transmit a report indicating a selected beam for beam failure recovery. As yet another example, the receiver wireless node may transmit an indication of radio link failure, an indication of radio link quality, an in-sync/out-of-sync indication, or a similar message. As another example, the receiver wireless node may select a suitable cell for camping, may perform cell reselection, may perform inactive mobility control, or a similar operation. As yet another example, the receiver wireless node or the transmitter wireless node may perform a handover, an RRC reestablishment, an RRC connection release with redirection, or a similar operation.

Figure 10:
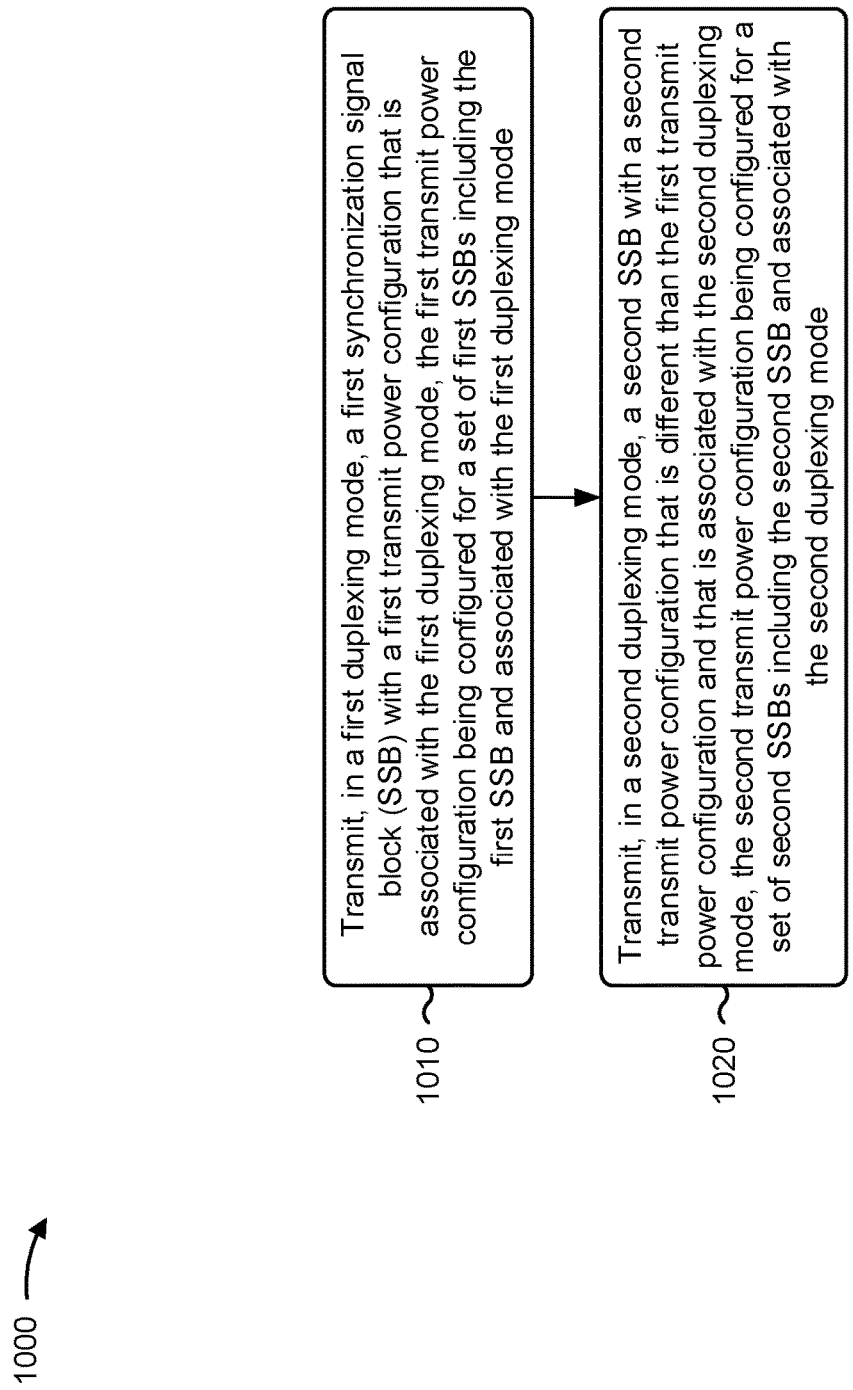
FIG. 10 is a diagram illustrating an example process performed, for example, by a transmitter wireless node.

FIG. 10 is a diagram illustrating an example process 1000 performed, for example, by an apparatus of a wireless node. The process 1000 is an example where an apparatus of a transmitter wireless node (for example, the UE 120 or the base station 110 of FIG. 1, the anchor base station 335 or the non-anchor base station 345 of FIG. 3, a DU of an IAB-donor 405 or an IAB-node 410 of FIG. 4, a parent IAB-node of FIG. 6, a base station as described in FIG. 7, or a transmitter wireless node 910) performs operations associated with transmit power adjustment for an SSB.

As shown in FIG. 10, in some aspects, the process 1000 may include transmitting, in a first duplexing mode, a first SSB with a first transmit power configuration that is associated with the first duplexing mode, the first transmit power configuration being configured for a set of first SSBs including the first SSB and associated with the first duplexing mode (block 1010). For example, the apparatus (such as by using communication manager 140, transmission component 1204, or power control component 1208, depicted in FIG. 12) may transmit, in a first duplexing mode, a first synchronization SSB with a first transmit power configuration. In some aspects, the first transmit power configuration may be associated with the first duplexing mode. In some aspects, the first transmit power configuration may be configured for a set of first SSBs including the first SSB and associated with the first duplexing mode.

As further shown in FIG. 10, in some aspects, the process 1000 may include transmitting, in a second duplexing mode, a second SSB with a second transmit power configuration that is different than the first transmit power configuration and that is associated with the second duplexing mode, the second transmit power configuration being configured for a set of second SSBs including the second SSB and associated with the second duplexing mode (block 1020). For example, the apparatus (such as by using communication manager 140, transmission component 1204, or power control component 1208, depicted in FIG. 12) may transmit, in a second duplexing mode, a second SSB with a second transmit power configuration. The second transmit power configuration may be different than the first transmit power configuration. In some aspects, the second transmit power configuration may be associated with the second duplexing mode. In some aspects, the second transmit power configuration may be configured for a set of second SSBs including the second SSB and associated with the second duplexing mode.

The process 1000 may include additional aspects, such as any single aspect or any combination of aspects described in connection with the process 1000 or in connection with one or more other processes described elsewhere herein.

In a first additional aspect, the process 1000 includes transmitting information indicating a power offset for the set of first SSBs associated with the first duplexing mode, where the first transmit power configuration is based on the power offset.

In a second additional aspect, alone or in combination with the first aspect, the information indicating the power offset is transmitted via at least one of remaining minimum system information (RMSI), a system information block (SIB), dedicated radio resource control (RRC) signaling, a group-common message, a functional split interface message, or an SSB transmission configuration (STC) associated with backhaul discovery.

In a third additional aspect, alone or in combination with one or more of the first and second aspects, the first duplexing mode is at least one of a half-duplex (HD) mode at the wireless node, a full-duplex (FD) mode at the wireless node, an FD mode at a receiver wireless node, an HD mode at a receiver wireless node, or an integrated access and backhaul (IAB) mode, where a resource for the first SSB overlaps with a resource for communication with a mobile termination.

In a fourth additional aspect, alone or in combination with one or more of the first through third aspects, the information indicating the power offset is transmitted to at least one of a receiver wireless node, a control node, or a central unit via a backhaul connection.

In a fifth additional aspect, alone or in combination with one or more of the first through fourth aspects, the process 1000 includes receiving, from a control node via a backhaul connection, information indicating a power offset for the set of first SSBs associated with the first duplexing mode, where the first transmit power configuration is based on the power offset.

In a sixth additional aspect, alone or in combination with one or more of the first through fifth aspects, the process 1000 includes transmitting information indicating an absolute transmit power for the set of first SSBs associated with the first duplexing mode, where the first transmit power configuration is based on the absolute transmit power.

In a seventh additional aspect, alone or in combination with one or more of the first through sixth aspects, the set of first SSBs are indicated using a bitmap.

In an eighth additional aspect, alone or in combination with one or more of the first through seventh aspects, the bitmap includes a number of bits equal to a total number of SSB candidates of the wireless node.

In a ninth additional aspect, alone or in combination with one or more of the first through eighth aspects, the bitmap includes a number of bits equal to a number of SSBs configured to be transmitted by the wireless node.

In a tenth additional aspect, alone or in combination with one or more of the first through ninth aspects, the set of first SSBs are indicated using a set of SSB indices.

In an eleventh additional aspect, alone or in combination with one or more of the first through tenth aspects, the first SSB is transmitted with the first transmit power configuration based on the first SSB being associated with a resource configuration corresponding to the first duplexing mode.

In a twelfth additional aspect, alone or in combination with one or more of the first through eleventh aspects, the resource configuration is at least one of a time division duplexing (TDD) configuration, a slot format indication (SFI), or an integrated access and backhaul (IAB) distributed unit (DU) resource configuration.

In a thirteenth additional aspect, alone or in combination with one or more of the first through twelfth aspects, the first SSB is transmitted with the first transmit power configuration based on the first SSB being transmitted on a resource that overlaps with a configured communication resource.

In a fourteenth additional aspect, alone or in combination with one or more of the first through thirteenth aspects, the first duplexing mode is a full-duplex mode at a receiver wireless node, and where the first transmit power configuration indicates an increased transmit power relative to the second transmit power configuration.

In a fifteenth additional aspect, alone or in combination with one or more of the first through fourteenth aspects, the first duplexing mode is a full-duplex mode at the wireless node, and where the first transmit power configuration indicates a decreased transmit power relative to the second transmit power configuration.

Although FIG. 10 shows example blocks of the process 1000, in some aspects, the process 1000 may include additional blocks, fewer blocks, different blocks, or differently arranged blocks than those depicted in FIG. 10. Additionally, or alternatively, two or more of the blocks of the process 1000 may be performed in parallel.

Figure 11:
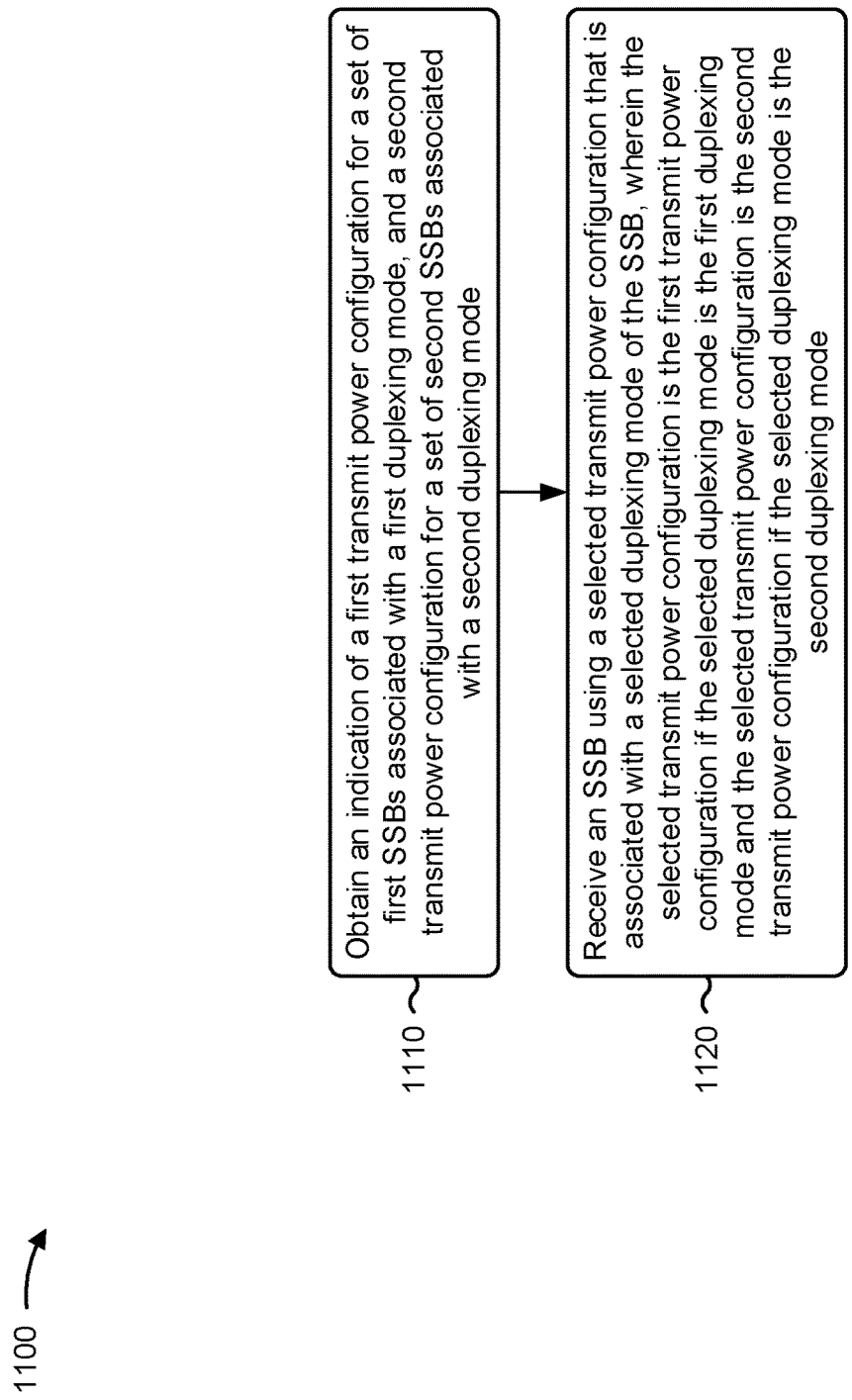
FIG. 11 is a diagram illustrating an example process performed, for example, by a receiver wireless node.

FIG. 11 is a diagram illustrating an example process 1100 performed, for example, by an apparatus of a wireless node. The process 1100 is an example where an apparatus of a receiver wireless node (for example, the UE 120 or the base station 110 of FIG. 1, the non-anchor base station 345 or the UE 355 of FIG. 3, an MT or a DU of an IAB-node 410 of FIG. 4, a child IAB-node of FIG. 6, a UE as described in FIG. 7, or a receiver wireless node 905) performs operations associated with transmit power adjustment for an SSB.

As shown in FIG. 11, in some aspects, the process 1100 may include obtaining an indication of a first transmit power configuration for a set of first SSBs associated with a first duplexing mode, and a second transmit power configuration for a set of second SSBs associated with a second duplexing mode (block 1110). For example, the apparatus (such as by using communication manager 150, reception component 1302, or power control component 1308, depicted in FIG. 13) may obtain an indication of a first transmit power configuration for a set of first SSBs associated with a first duplexing mode. The apparatus may obtain a second transmit power configuration for a set of second SSBs associated with a second duplexing mode.

As further shown in FIG. 11, in some aspects, the process 1100 may include receiving an SSB using a selected transmit power configuration that is associated with a selected duplexing mode of the SSB, where the selected transmit power configuration is the first transmit power configuration if the selected duplexing mode is the first duplexing mode and the selected transmit power configuration is the second transmit power configuration if the selected duplexing mode is the second duplexing mode (block 1120). For example, the apparatus (such as by using communication manager, reception component 1302, or power control component 1308, depicted in FIG. 13) may receive an SSB using a selected transmit power configuration that is associated with a selected duplexing mode of the SSB. The selected transmit power configuration may be the first transmit power configuration if the selected duplexing mode is the first duplexing mode. The selected transmit power configuration may be the second transmit power configuration if the selected duplexing mode is the second duplexing mode.

The process 1100 may include additional aspects, such as any single aspect or any combination of aspects described in connection with the process 1100 or in connection with one or more other processes described elsewhere herein.

In a first additional aspect, the process 1100 includes receiving information indicating a power offset for a set of SSBs, of the set of first SSBs and the set of second SSBs and associated with the selected duplexing mode, where the selected transmit power configuration is based on the power offset.

In a second additional aspect, alone or in combination with the first aspect, the information indicating the power offset is received via at least one of RMSI, a SIB, dedicated RRC signaling, a group-common message, a functional split interface message, or an STC associated with backhaul discovery.

In a third additional aspect, alone or in combination with one or more of the first and second aspects, the selected duplexing mode is at least one of a HD mode at a transmitter wireless node from which the SSB is received, a FD mode at the transmitter wireless node, an FD mode at the wireless node, an HD mode at a receiver wireless node, or an IAB mode, where a resource for the SSB overlaps with a resource for communication with a mobile termination.

In a fourth additional aspect, alone or in combination with one or more of the first through third aspects, the process 1100 includes receiving, from a central unit or a distributed unit, information indicating a power offset for a set of SSBs, of the set of first SSBs and the set of second SSBs and associated with the selected duplexing mode, where the selected transmit power configuration is based on the power offset.

In a fifth additional aspect, alone or in combination with one or more of the first through fourth aspects, the process 1100 includes receiving information indicating an absolute transmit power for the set of first SSBs associated with the first duplexing mode, where the first transmit power configuration is based on the absolute transmit power.

In a sixth additional aspect, alone or in combination with one or more of the first through fifth aspects, the selected transmit power configuration is configured for a set of SSBs, of the set of first SSBs and the set of second SSBs and associated with the selected duplexing mode, and where the set of SSBs are indicated using a bitmap.

In a seventh additional aspect, alone or in combination with one or more of the first through sixth aspects, the selected transmit power configuration is configured for a set of SSBs, of the set of first SSBs and the set of second SSBs and associated with the selected duplexing mode, and where the set of SSBs are indicated using a set of SSB indices.

In an eighth additional aspect, alone or in combination with one or more of the first through seventh aspects, the SSB is received using the selected transmit power configuration based on the SSB being associated with a resource configuration corresponding to the selected duplexing mode.

In a ninth additional aspect, alone or in combination with one or more of the first through eighth aspects, the resource configuration is at least one of a TDD configuration, an SFI, or an IAB DU resource configuration.

In a tenth additional aspect, alone or in combination with one or more of the first through ninth aspects, the SSB is received using the selected transmit power configuration based on the SSB being received on a resource that overlaps with a configured communication resource.

In an eleventh additional aspect, alone or in combination with one or more of the first through tenth aspects, the process 1100 includes performing measurement or reporting regarding the SSB.

In a twelfth additional aspect, alone or in combination with one or more of the first through eleventh aspects, the measurement or reporting includes at least one of beaming failure detection, beaming failure recovery, radio link monitoring, or radio resource management.

In a thirteenth additional aspect, alone or in combination with one or more of the first through twelfth aspects, the SSB is a first SSB of the set of first SSBs and the selected transmit power configuration is the first transmit power configuration, and where the method further includes skipping measurement or reporting of a second SSB of the set of second SSBs associated with the second transmit power configuration, where the second transmit power configuration is associated with a lower transmit power than the first transmit power configuration.

In a fourteenth additional aspect, alone or in combination with one or more of the first through thirteenth aspects, an evaluation period for the measurement or reporting regarding the first SSB is extended.

Although FIG. 11 shows example blocks of the process 1100, in some aspects, the process 1100 may include additional blocks, fewer blocks, different blocks, or differently arranged blocks than those depicted in FIG. 11. Additionally, or alternatively, two or more of the blocks of the process 1100 may be performed in parallel.

Figure 12:
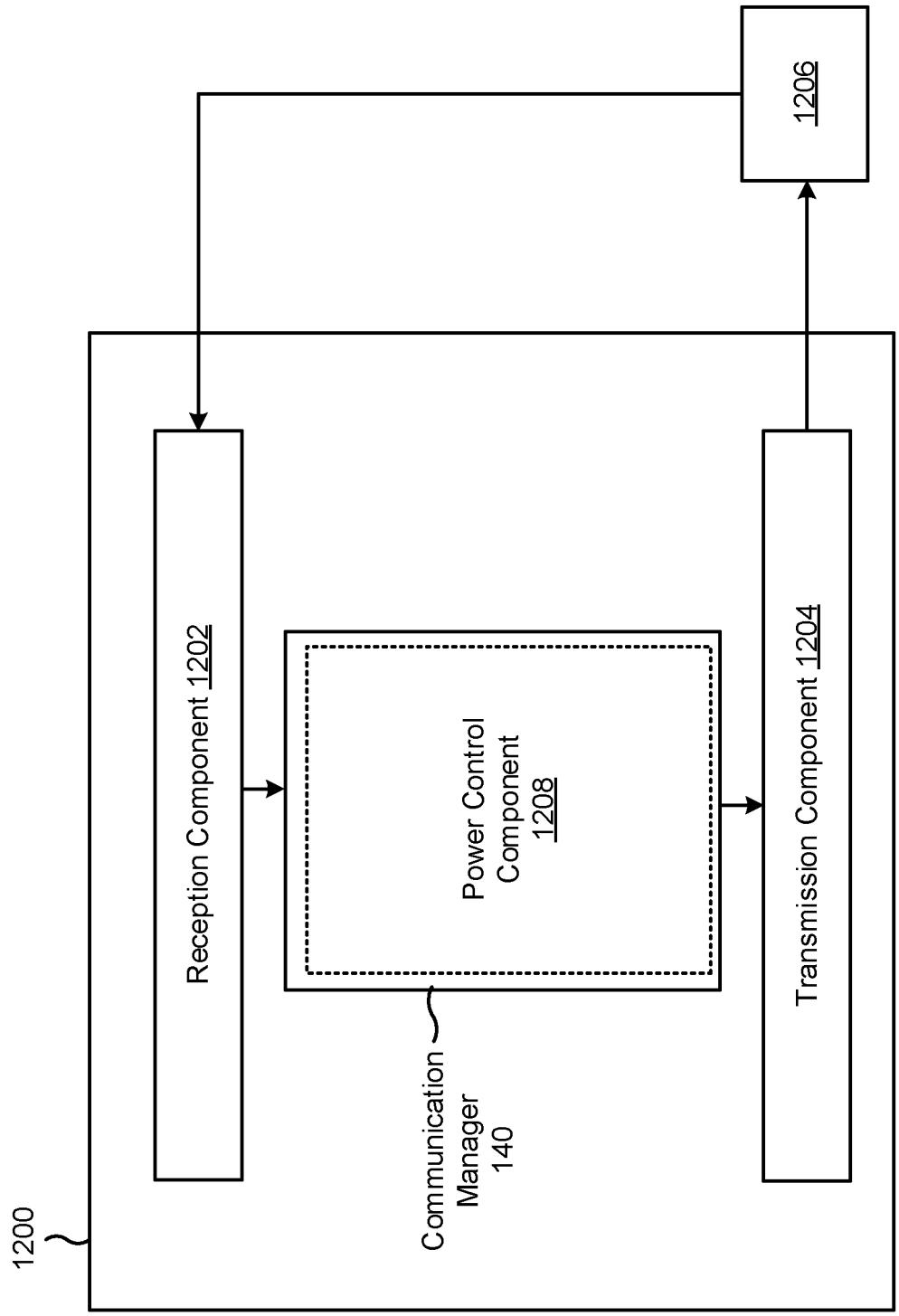
FIGS. 12 and 13 are diagrams of example apparatuses for wireless communication.

FIG. 12 is a diagram of an example apparatus 1200 for wireless communication. The apparatus 1200 may be a wireless node (such as a transmitter wireless node), or a wireless node (such as a transmitter wireless node) may include the apparatus 1200. In some aspects, the apparatus 1200 includes a reception component 1202 and a transmission component 1204, which may be in communication with one another (for example, via one or more buses or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include a power control component 1208, among other examples.

In some aspects, the apparatus 1200 may be configured to perform one or more operations described herein in connection with FIGS. 3 through 9. Additionally or alternatively, the apparatus 1200 may be configured to perform one or more processes described herein, such as process 1000 of FIG. 10, or a combination thereof. In some aspects, the apparatus 1200 or one or more components shown in FIG. 12 may include one or more components of the wireless node described in connection with FIG. 2. Additionally or alternatively, one or more components shown in FIG. 12 may be implemented within one or more components described in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a modem, a demodulator, a MIMO detector, a receive processor, a controller/processor, a memory, or a combination thereof, of the wireless node described in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the wireless node described in connection with FIG. 2. In some aspects, the transmission component 1204 may be co-located with the reception component 1202 in a transceiver.

The transmission component 1204 or the power control component 1208 may transmit, in a first duplexing mode, a first SSB with a first transmit power configuration that is associated with the first duplexing mode, the first transmit power configuration being configured for a set of first SSBs including the first SSB and associated with the first duplexing mode. The transmission component 1204 or the power control component 1208 may transmit, in a second duplexing mode, a second SSB with a second transmit power configuration that is different than the first transmit power configuration and that is associated with the second duplexing mode, the second transmit power configuration being configured for a set of second SSBs including the second SSB and associated with the second duplexing mode.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
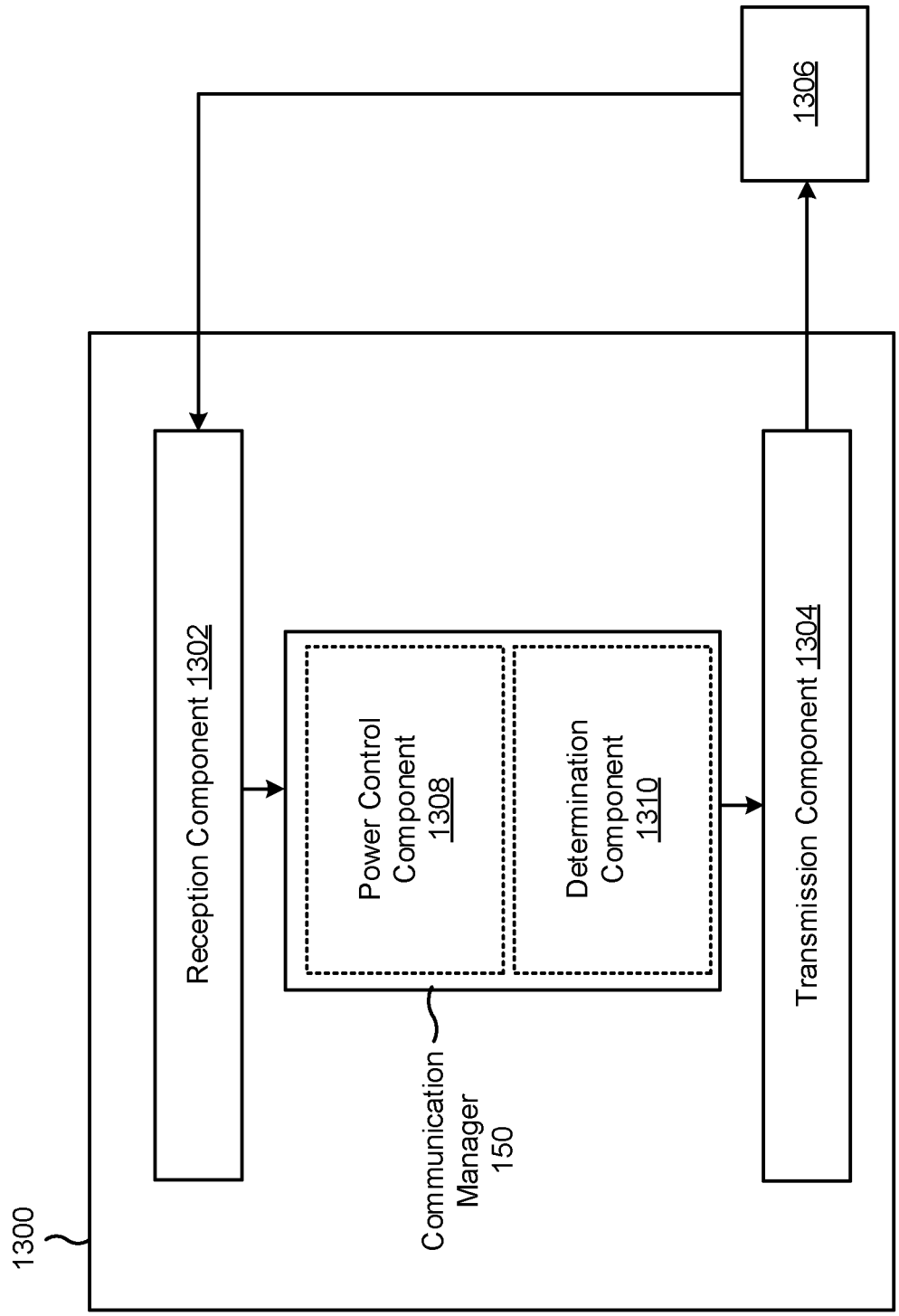

FIG. 13 is a diagram of an example apparatus 1300 for wireless communication. The apparatus 1300 may be a wireless node (such as a receiver wireless node), or a wireless node (such as a receiver wireless node) may include the apparatus 1300. In some aspects, the apparatus 1300 includes a reception component 1302 and a transmission component 1304, which may be in communication with one another (for example, via one or more buses or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 150. The communication manager 150 may include a power control component 1308 and a determination component 1310, among other examples.

In some aspects, the apparatus 1300 may be configured to perform one or more operations described herein in connection with FIGS. 3 through 9. Additionally or alternatively, the apparatus 1300 may be configured to perform one or more processes described herein, such as process 1100 of FIG. 11, or a combination thereof. In some aspects, the apparatus 1300 or one or more components shown in FIG. 13 may include one or more components of the wireless node described in connection with FIG. 2. Additionally or alternatively, one or more components shown in FIG. 13 may be implemented within one or more components described in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a modem, a demodulator, a MIMO detector, a receive processor, a controller/processor, a memory, or a combination thereof, of the wireless node described in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the wireless node described in connection with FIG. 2. In some aspects, the transmission component 1304 may be co-located with the reception component 1302 in a transceiver.

The reception component 1302 or the determination component 1310 may obtain an indication of a first transmit power configuration for a set of first SSBs associated with a first duplexing mode, and a second transmit power configuration for a set of second SSBs associated with a second duplexing mode. The reception component 1302 or the power control component 1308 may receive an SSB using a selected transmit power configuration that is associated with a selected duplexing mode of the SSB, where the selected transmit power configuration is the first transmit power configuration if the selected duplexing mode is the first duplexing mode and the selected transmit power configuration is the second transmit power configuration if the selected duplexing mode is the second duplexing mode.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The foregoing disclosure provides illustration and description but is not intended to be exhaustive or to limit the aspects to the precise forms disclosed. Modifications and variations may be made in light of the disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. An apparatus of a wireless node for wireless communication, comprising:
   one or more interfaces configured to:
   output, in a first duplexing mode, a first synchronization signal block (SSB) with a first transmit power configuration that is associated with the first duplexing mode, the first transmit power configuration being configured for a set of first SSBs including the first SSB and associated with the first duplexing mode; and
   output, in a second duplexing mode, a second SSB with a second transmit power configuration that is different than the first transmit power configuration and that is associated with the second duplexing mode, the second transmit power configuration being configured for a set of second SSBs including the second SSB and in accordance with a signal to interference noise ratio (SINR), wherein the SINR is associated with the second duplexing mode.

2. The apparatus of claim 1, wherein the one or more interfaces are further configured to:
   output information indicating a power offset for the set of first SSBs associated with the first duplexing mode, wherein the first transmit power configuration is based on the power offset.

3. The apparatus of claim 2, wherein the information indicating the power offset is outputted via at least one of:
   remaining minimum system information (RMSI),
   a system information block (SIB),
   dedicated radio resource control (RRC) signaling,
   a group-common message,
   a functional split interface message, or
   an SSB transmission configuration (STC) associated with backhaul discovery.

4. The apparatus of claim 2, wherein the first duplexing mode is at least one of:
   a half-duplex (HD) mode at the wireless node,
   a full-duplex (FD) mode at the wireless node,
   an FD mode at a receiver wireless node,
   an HD mode at the receiver wireless node, or
   an integrated access and backhaul (IAB) mode, wherein a resource for the first SSB overlaps with a resource for communication with a mobile termination.

5. The apparatus of claim 2, wherein the information indicating the power offset is destined to at least one of:
   a receiver wireless node,
   a control node, or
   a central unit via a backhaul connection.

6. The apparatus of claim 1, wherein the one or more interfaces are further configured to:
   obtain, from a control node via a backhaul connection, information indicating a power offset for the set of first SSBs associated with the first duplexing mode, wherein the first transmit power configuration is based on the power offset.

7. The apparatus of claim 1, wherein the one or more interfaces are further configured to:
   output information indicating an absolute transmit power for the set of first SSBs associated with the first duplexing mode, wherein the first transmit power configuration is based on the absolute transmit power.

8. The apparatus of claim 1, wherein the set of first SSBs are indicated using a bitmap.

9. The apparatus of claim 8, wherein the bitmap includes a number of bits equal to a total number of SSB candidates of the wireless node.

10. The apparatus of claim 8, wherein the bitmap includes a number of bits equal to a number of SSBs configured to be outputted by the wireless node.

11. The apparatus of claim 1, wherein the set of first SSBs are indicated using a set of SSB indices.

12. The apparatus of claim 1, wherein the first SSB is outputted with the first transmit power configuration based on the first SSB being associated with a resource configuration corresponding to the first duplexing mode.

13. The apparatus of claim 12, wherein the resource configuration is at least one of:
a time division duplexing (TDD) configuration,
a slot format indication (SFI), or
an integrated access and backhaul (IAB) distributed unit (DU) resource configuration.

14. The apparatus of claim 1, wherein the first SSB is outputted with the first transmit power configuration based on the first SSB being outputted on a resource that overlaps with a configured communication resource.

15. The apparatus of claim 1, wherein the first duplexing mode is a full-duplex mode at a receiver wireless node, and wherein the first transmit power configuration indicates an increased transmit power relative to the second transmit power configuration.

16. The apparatus of claim 1, wherein the first duplexing mode is a full-duplex mode at the wireless node, and wherein the first transmit power configuration indicates a decreased transmit power relative to the second transmit power configuration.

17. An apparatus of a wireless node for wireless communication, comprising:
one or more interfaces configured to:
obtain an indication of a first transmit power configuration for a set of first synchronization signal blocks (SSBs) associated with a first duplexing mode, and a second transmit power configuration for a set of second SSBs, wherein the second transmit power configuration is in accordance with a signal to interference noise ratio (SINR), wherein the SINR is associated with a second duplexing mode; and
obtain an SSB using a selected transmit power configuration that is associated with a selected duplexing mode of the SSB, the selected transmit power configuration being the first transmit power configuration if the selected duplexing mode is the first duplexing mode and the selected transmit power configuration is the second transmit power configuration if the selected duplexing mode is the second duplexing mode.

18. The apparatus of claim 17, wherein the one or more interfaces are further configured to:
obtain information indicating a power offset for a set of SSBs, of the set of first SSBs and the set of second SSBs and associated with the selected duplexing mode, wherein the selected transmit power configuration is based on the power offset.

19. The apparatus of claim 17, wherein the one or more interfaces are further configured to:
obtain, from a central unit or a distributed unit, information indicating a power offset for a set of SSBs, of the set of first SSBs and the set of second SSBs and associated with the selected duplexing mode, wherein the selected transmit power configuration is based on the power offset.

20. The apparatus of claim 17, wherein the one or more interfaces are further configured to:
obtain information indicating an absolute transmit power for the set of first SSBs associated with the first duplexing mode, wherein the first transmit power configuration is based on the absolute transmit power.

21. The apparatus of claim 17, further comprising a processing system configured to:
perform measurement or reporting regarding the SSB.

22. The apparatus of claim 21, wherein the SSB is a first SSB of the set of first SSBs and the selected transmit power configuration is the first transmit power configuration, and wherein the processing system is further configured to:
skip measurement or reporting of a second SSB of the set of second SSBs associated with the second transmit power configuration, wherein the second transmit power configuration is associated with a lower transmit power than the first transmit power configuration.

23. A method of wireless communication performed by an apparatus of a wireless node, comprising:
transmitting, in a first duplexing mode, a first synchronization signal block (SSB) with a first transmit power configuration that is associated with the first duplexing mode, the first transmit power configuration being configured for a set of first SSBs including the first SSB and associated with the first duplexing mode; and
transmitting, in a second duplexing mode, a second SSB with a second transmit power configuration that is different than the first transmit power configuration and that is associated with the second duplexing mode, the second transmit power configuration being configured for a set of second SSBs including the second SSB and in accordance with a signal to interference noise ratio (SINR), wherein the SINR is associated with the second duplexing mode.

24. The method of claim 23, further comprising:
transmitting information indicating a power offset for the set of first SSBs associated with the first duplexing mode, wherein the first transmit power configuration is based on the power offset.

25. The method of claim 23, further comprising:
receiving, from a control node via a backhaul connection, information indicating a power offset for the set of first SSBs associated with the first duplexing mode, wherein the first transmit power configuration is based on the power offset.

26. The method of claim 23, further comprising:
transmitting information indicating an absolute transmit power for the set of first SSBs associated with the first duplexing mode, wherein the first transmit power configuration is based on the absolute transmit power.

27. A method of wireless communication performed by an apparatus of a wireless node, comprising:
obtaining an indication of a first transmit power configuration for a set of first synchronization signal blocks (SSBs) associated with a first duplexing mode, and a second transmit power configuration for a set of second SSBs, wherein the second transmit power configuration is in accordance with a signal to interference noise ratio (SINR), wherein the SINR is associated with a second duplexing mode; and
receiving an SSB using a selected transmit power configuration that is associated with a selected duplexing mode of the SSB, the selected transmit power configuration being the first transmit power configuration if the selected duplexing mode is the first duplexing mode and the selected transmit power configuration is the second transmit power configuration if the selected duplexing mode is the second duplexing mode.

28. The method of claim 27, further comprising:
receiving information indicating a power offset for a set of SSBs, of the set of first SSBs and the set of second SSBs and associated with the selected duplexing mode, wherein the selected transmit power configuration is based on the power offset.

29. The method of claim 27, further comprising:
receiving, from a central unit or a distributed unit, information indicating a power offset for a set of SSBs, of the set of first SSBs and the set of second SSBs and associated with the selected duplexing mode, wherein the selected transmit power configuration is based on the power offset.

30. The method of claim 27, further comprising:
performing measurement or reporting regarding the SSB.

* * * * *